US009229800B2

(12) United States Patent
Jain et al.

(10) Patent No.: US 9,229,800 B2
(45) Date of Patent: Jan. 5, 2016

(54) PROBLEM INFERENCE FROM SUPPORT TICKETS

(75) Inventors: Navendu Jain, Seattle, WA (US); Rahul Potharaju, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 13/535,366

(22) Filed: Jun. 28, 2012

(65) Prior Publication Data

US 2014/0006861 A1 Jan. 2, 2014

(51) Int. Cl.
| | |
|---|---|
| *G06F 11/00* | (2006.01) |
| *G06F 11/07* | (2006.01) |
| *G06Q 30/00* | (2012.01) |
| *H04L 12/24* | (2006.01) |
| *H04L 12/26* | (2006.01) |

(52) U.S. Cl.
CPC .......... *G06F 11/079* (2013.01); *G06F 11/0709* (2013.01); *G06Q 30/01* (2013.01); *H04L 41/069* (2013.01); *H04L 41/16* (2013.01); *H04L 41/5074* (2013.01); *H04L 43/045* (2013.01)

(58) Field of Classification Search
CPC .......... G06F 11/0766–11/0793; G06F 17/27–17/2795
See application file for complete search history.

(56) References Cited

U.S. PATENT DOCUMENTS

| | | | |
|---|---|---|---|
| 4,816,994 A * | 3/1989 | Freiling et al. ................... 706/59 |
| 5,483,637 A | 1/1996 | Winokur et al. |
| 6,118,936 A | 9/2000 | Lauer et al. |
| 6,131,112 A * | 10/2000 | Lewis et al. .................. 709/207 |
| 6,249,755 B1 | 6/2001 | Yemini et al. |
| 6,353,902 B1 | 3/2002 | Kulatunge et al. |
| 6,742,141 B1 | 5/2004 | Miller |
| 6,785,226 B1 | 8/2004 | Oltman et al. |
| 6,820,221 B2 | 11/2004 | Fleming |
| 6,829,734 B1 * | 12/2004 | Kreulen et al. ................. 714/46 |
| 7,010,593 B2 | 3/2006 | Raymond |
| 7,039,827 B2 | 5/2006 | Meyer et al. |
| 7,047,291 B2 | 5/2006 | Breese et al. |
| 7,085,697 B1 | 8/2006 | Rappaport et al. |

(Continued)

FOREIGN PATENT DOCUMENTS

| | | |
|---|---|---|
| WO | 2014/078592 A2 | 5/2014 |
| WO | 2014/078668 A2 | 5/2014 |

OTHER PUBLICATIONS

Spasic et al., "Text Mining and Ontologies in Biomedicine: Making Sense of Raw Text", Sep. 2005, Briefings in Bioinformatics, vol. 6, No. 3, pp. 239-251.*

(Continued)

*Primary Examiner* — Michael Maskulinski
(74) *Attorney, Agent, or Firm* — Alin Corie; Sandy Swain; Micky Minhas

(57) ABSTRACT

The described implementations relate to processing of electronic data. One implementation is manifested as a system that can include an inference engine and at least one processing device configured to execute the inference engine. The inference engine can be configured to perform automated detection of concepts expressed in failure logs that include unstructured data. For example, the inference engine can analyze text of support tickets or diary entries relating to troubleshooting of an electronic network to obtain concepts identifying problems, actions, or activities. The inference engine can also be configured to generate output that reflects the identified concepts, e.g., via a visualization or queryable programming interface.

20 Claims, 11 Drawing Sheets

(56) References Cited

U.S. PATENT DOCUMENTS

| | | | |
|---|---|---|---|
| 7,209,923 B1 | 4/2007 | Cooper | |
| 7,228,453 B2 | 6/2007 | O'Brien et al. | |
| 7,246,159 B2* | 7/2007 | Aggarwal et al. | 709/220 |
| 7,313,736 B2 | 12/2007 | Scrandis et al. | |
| 7,315,887 B1 | 1/2008 | Liang et al. | |
| 7,451,210 B2 | 11/2008 | Gupta et al. | |
| 7,539,907 B1 | 5/2009 | Johnsen et al. | |
| 7,565,661 B2 | 7/2009 | Sim-Tang | |
| 7,580,956 B1 | 8/2009 | Xin et al. | |
| 7,596,083 B2 | 9/2009 | Klos et al. | |
| 7,813,298 B2 | 10/2010 | Lidstrom et al. | |
| 7,853,544 B2 | 12/2010 | Scott et al. | |
| 7,965,620 B2 | 6/2011 | Gadgil et al. | |
| 7,995,485 B1 | 8/2011 | Anderson et al. | |
| 8,032,489 B2 | 10/2011 | Villella et al. | |
| 8,046,637 B2 | 10/2011 | Gross et al. | |
| 8,107,363 B1 | 1/2012 | Saluja | |
| 8,112,667 B2 | 2/2012 | Belluomini et al. | |
| 8,135,995 B2 | 3/2012 | Ngai et al. | |
| 8,161,325 B2* | 4/2012 | Calman et al. | 714/26 |
| 8,169,921 B2* | 5/2012 | Yang et al. | 370/242 |
| 8,181,071 B2 | 5/2012 | Cahill et al. | |
| 8,195,692 B2* | 6/2012 | Baek | G06F 17/2785 706/45 |
| 8,260,893 B1 | 9/2012 | Bandhole et al. | |
| 8,738,968 B2 | 5/2014 | Kanso et al. | |
| 8,831,202 B1 | 9/2014 | Abidogun et al. | |
| 8,838,599 B2 | 9/2014 | Xu et al. | |
| 8,862,948 B1 | 10/2014 | Lam | |
| 8,892,550 B2* | 11/2014 | Chu-Carroll | G06F 17/30637 707/728 |
| 8,892,960 B2 | 11/2014 | Sambamurthy et al. | |
| 8,996,539 B2* | 3/2015 | Agrawal | G06F 17/30616 707/749 |
| 9,065,730 B2 | 6/2015 | Craig et al. | |
| 9,183,194 B2* | 11/2015 | Verma | G06F 17/2725 |
| 9,201,955 * | 12/2015 | Quintao | G06F 17/2795 |
| 2002/0124214 A1 | 9/2002 | Ahrens et al. | |
| 2002/0156817 A1 | 10/2002 | Lemus | |
| 2002/0161873 A1* | 10/2002 | McGuire | H04L 41/0213 709/223 |
| 2002/0174384 A1 | 11/2002 | Graichen et al. | |
| 2003/0014462 A1 | 1/2003 | Bennett et al. | |
| 2003/0023719 A1 | 1/2003 | Castelli et al. | |
| 2003/0034995 A1 | 2/2003 | Osborn et al. | |
| 2003/0046615 A1 | 3/2003 | Stone | |
| 2003/0093481 A1 | 5/2003 | Mitchell et al. | |
| 2003/0110408 A1 | 6/2003 | Wells et al. | |
| 2003/0123446 A1 | 7/2003 | Muirhead et al. | |
| 2003/0172046 A1* | 9/2003 | Scott | 707/1 |
| 2004/0088386 A1* | 5/2004 | Aggarwal | G06F 11/3495 709/220 |
| 2004/0225952 A1 | 11/2004 | Brown et al. | |
| 2005/0138170 A1 | 6/2005 | Cherkasova et al. | |
| 2005/0138486 A1* | 6/2005 | Gromyko | 714/49 |
| 2005/0154690 A1* | 7/2005 | Nitta et al. | 706/46 |
| 2005/0171948 A1* | 8/2005 | Knight | 707/6 |
| 2005/0181835 A1 | 8/2005 | Lau et al. | |
| 2005/0188240 A1 | 8/2005 | Murphy et al. | |
| 2005/0222811 A1 | 10/2005 | Jakobson et al. | |
| 2005/0276217 A1 | 12/2005 | Gadgil et al. | |
| 2006/0179432 A1 | 8/2006 | Walinga et al. | |
| 2006/0218267 A1 | 9/2006 | Khan et al. | |
| 2007/0028139 A1 | 2/2007 | Wahl et al. | |
| 2007/0192406 A1 | 8/2007 | Frietsch et al. | |
| 2008/0016412 A1 | 1/2008 | White et al. | |
| 2008/0077682 A1 | 3/2008 | Nair et al. | |
| 2008/0291822 A1 | 11/2008 | Farkas et al. | |
| 2009/0055684 A1 | 2/2009 | Jamjoom et al. | |
| 2009/0063387 A1 | 3/2009 | Beaty et al. | |
| 2009/0138306 A1 | 5/2009 | Coburn et al. | |
| 2009/0183030 A1 | 7/2009 | Bethke et al. | |
| 2009/0262650 A1 | 10/2009 | Shaikh et al. | |
| 2010/0034080 A1 | 2/2010 | Charzinski et al. | |
| 2010/0049590 A1 | 2/2010 | Anshul | |
| 2010/0100775 A1 | 4/2010 | Slutsman et al. | |
| 2010/0124165 A1 | 5/2010 | Yang et al. | |
| 2010/0125745 A1 | 5/2010 | Kogan et al. | |
| 2010/0131952 A1 | 5/2010 | Akiyama et al. | |
| 2010/0138688 A1 | 6/2010 | Sykes et al. | |
| 2010/0189113 A1 | 7/2010 | Csaszar et al. | |
| 2010/0218104 A1 | 8/2010 | Lewis | |
| 2010/0287403 A1 | 11/2010 | Jenkins et al. | |
| 2010/0302940 A1 | 12/2010 | Patel et al. | |
| 2010/0313070 A1 | 12/2010 | Joshi et al. | |
| 2010/0332911 A1 | 12/2010 | Ramananda et al. | |
| 2011/0087522 A1 | 4/2011 | Beaty et al. | |
| 2011/0153539 A1 | 6/2011 | Rojahn | |
| 2011/0191623 A1 | 8/2011 | Dennert | |
| 2011/0239050 A1 | 9/2011 | Malisetti et al. | |
| 2011/0276836 A1 | 11/2011 | Kahana et al. | |
| 2011/0289076 A1 | 11/2011 | Boyle et al. | |
| 2011/0313962 A1 | 12/2011 | Jones et al. | |
| 2012/0185582 A1 | 7/2012 | Graessley | |
| 2012/0185735 A1 | 7/2012 | Sambamurthy et al. | |
| 2012/0213081 A1 | 8/2012 | Satoshi | |
| 2012/0213227 A1 | 8/2012 | Jaeger | |
| 2012/0218104 A1 | 8/2012 | Lai | |
| 2012/0239975 A1 | 9/2012 | Bodke et al. | |
| 2012/0245924 A1 | 9/2012 | Brun | |
| 2012/0254395 A1 | 10/2012 | Bonas | |
| 2012/0263044 A1 | 10/2012 | Akahane et al. | |
| 2012/0290715 A1* | 11/2012 | Dinger et al. | 709/224 |
| 2013/0097304 A1 | 4/2013 | Asthana et al. | |
| 2013/0138419 A1 | 5/2013 | Lopez et al. | |
| 2013/0204808 A1 | 8/2013 | Jiang et al. | |
| 2013/0226525 A1 | 8/2013 | Marwah et al. | |
| 2013/0227115 A1 | 8/2013 | Hobbs et al. | |
| 2013/0232382 A1 | 9/2013 | Jain et al. | |
| 2013/0286852 A1 | 10/2013 | Bowler et al. | |
| 2013/0290783 A1 | 10/2013 | Bowler et al. | |
| 2013/0291034 A1 | 10/2013 | Basile et al. | |
| 2013/0332145 A1* | 12/2013 | Bostick et al. | 704/9 |
| 2013/0332399 A1 | 12/2013 | Reddy et al. | |
| 2014/0006862 A1 | 1/2014 | Jain et al. | |
| 2014/0047271 A1 | 2/2014 | Gray et al. | |
| 2014/0136684 A1 | 5/2014 | Jain et al. | |
| 2014/0136690 A1 | 5/2014 | Jain et al. | |
| 2014/0325019 A1 | 10/2014 | Austin et al. | |
| 2014/0379895 A1 | 12/2014 | Jain | |
| 2015/0006519 A1 | 1/2015 | Jain et al. | |
| 2015/0032500 A1 | 1/2015 | Cope et al. | |
| 2015/0302094 A1* | 10/2015 | Bobick | G06F 17/2795 707/706 |
| 2015/0317301 A1* | 11/2015 | Liang | G06F 17/2775 704/9 |

OTHER PUBLICATIONS

Law et al., "An Integrated Case-Based Reasoning Approach for Intelligent Help Desk Fault Management", 1997, Expert Systems with Applications, vol. 13, No. 4, pp. 265-274.*
Ahonen et al., "Applying Data Mining Techniques for Descriptive Phrase Extraction in Digital Document Collections", 1998, IEEE, Proceedings of ADL '98, Apr. 22-24, 1998, pp. 1-10.*
Aguilera, et al., "Performance Debugging for Distributed Systems of Black Boxes", Retrieved at <<http://pdos.csail.mit.edu/~athicha/papers/blackboxes:sosp03.pdf>>, In Proceedings of the Nineteenth ACM Symposium on Operating Systems Principles, Oct. 19, 2003, pp. 16.
Aho, et al., "Efficient String Matching: An Aid to Bibliographic Search", Retrieved at <<http://cisc-w09.isrl.kr/cgi-bin/TUBoard/db/seminar/upload/1183356194165246034173/p333-aho-corasick. pdf>>, In Communications of the ACM, vol. 18, No. 6, Jun. 1975, pp. 8.
Barnes, et al., "A Hierarchical O (N log N) Force-calculation Algorithm", Retrieved at <<http://www.ecs.umass.edu/~mettu/ece665/barnes_86.pdf>>, In Letters to Nature, vol. 324, Issue 4, Dec. 1986, pp. 4.
Bostock, et al., "D3: Data-Driven Documents.", Retrieved at <<http://vis.stanford.edu/files/2011-D3-InfoVis.pdf>>, In IEEE Transactions on Visualization and Computer Graphics, vol. 17, No. 12, Jan. 2011, pp. 9.

(56) References Cited

OTHER PUBLICATIONS

Brauckhoff, et al., "Anomaly Extraction in Backbone Networks using Association Rules", Retrieved at <<http://www.csg.ethz.ch/people/dimitroc/papers/imc09.pdf>>, In Proceedings of the 9th ACM SIGCOMM Conference on Internet Measurement Conference, Nov. 4, 2009, pp. 7.

Bray, et al., "Extensible Markup Language (XML)", Retrieved at <<http://www.w3.org/TR/PR-xml-971208>>, In Journal of World Wide Web Consortium, Dec. 8, 1997, pp. 7.

Church, et al., "Word Association Norms, Mutual Information, and Lexicography", Retrieved at <<http://acl.ldc.upenn.edu/J/J90/J90-1003.pdf>>, In Journal of Computational Linguistics, vol. 16, No. 1, Mar. 1990, pp. 8.

Cohen, et al., "Capturing, Indexing, Clustering, and Retrieving System History", Retrieved at <<http://www.research.rutgers.edu/~lekien/papers/Cohen_etalSOSP2005.pdf>>, In Proceedings of the Twentieth ACM Symposium on Operating systems Principles, Oct. 23, 2005, pp. 14.

Cooley, et al., "Web Mining: Information and Pattern Discovery on the World Wide Web", Retrieved at <<http://ieeexplore.ieee.org/stamp/stamp.jsp?tp=&arnumber=632303>>, In Proceedings of the Ninth IEEE International Conference on Tools with Artificial Intelligence, Nov. 3, 1997, pp. 10.

Deerwester, et al., "Indexing by Latent Semantic Analysis", Retrieved at <<http://www.cob.unt.edu/itds/faculty/evangelopoulos/dsci5910/LSA_Deerwester1990.pdf>>, In Journal of the American Society for Information Science, vol. 41, Issue 6, Sep. 1990, pp. 17.

Fielding, Roy Thomas., "Architectural Styles and the Design of Network-based Software Architectures", Retrieved at <<http://jpkc.fudan.edu.cn/picture/article/216/35/4b/22598d594e3d93239700ce79bce1/7ed3ec2a-03c2-49cb-8bf8-5a90ea42f523.pdf>>, In Doctoral Dissertation Architectural Styles and the Design of Network-based Software Architectures, Aug. 8, 2012, pp. 180.

Ford, et al., "Availability in Globally Distributed Storage Systems", Retrieved at <<http://static.usenix.org/event/osdi10/tech/full_papers/Ford.pdf>>, In Proceedings of the 9th USENIX Conference on Operating Systems Design and Implementation, Oct. 4, 2010, pp. 14.

Garrett, Jesse James., "Ajax: A New Approach to Web Applications", Retrieved at <<http://scholar.googleusercontent.com/scholar?q=cache:DY1KmbMV5IMJ:scholar.google.com/+Ajax:+A+new+approach+to+web+applications&hl=en&as_sdt=0,5>>, Feb. 18, 2005, pp. 14.

Gill, et al., "Understanding Network Failures in Data Centers: Measurement, Analysis, and Implications", Retrieved at <<http://conferences.sigcomm.org/sigcomm/2011/papers/sigcomm/p350.pdf>>, In Proceedings of the ACM SIGCOMM Conference, Aug. 15, 2011, pp. 12.

Goldstein, et al., "Summarizing Text Documents: Sentence Selection and Evaluation Metrics", Retrieved at <<http://www.cs.cmu.edu/afs/cs.cmu.edu/Web/People/jgc/publication/Summarizing_Text_Documents_Sentence_SIGIR_1999.pdf>>, In Proceedings of the 22nd Annual International ACM SIGIR Conference on Research and Development in Information Retrieval, Aug. 15, 1999, pp. 8.

Gruber, Thomas R.., "Toward Principles for the Design of Ontologies Used for Knowledge Sharing", Retrieved at <<http://www.civ.utoronto.ca/sect/coneng/i2c/Civ1283/Civ1283-Ref-Final/Civ1283-Advanced%20Ref/Ontology/Gruber%20paper.pdf>>, In International Journal of Human-Computer Studies—Special Issue, Nov. 1995, pp. 22.

"HTML5: A Vocabulary and Associated APIs for HTML and XHTML.", Retrieved at <<http://www.w3.org/TR/2010/WD-html5-20100624/>>, Aug. 7, 2012, pp. 23.

Huang, et al., "Diagnosing Network Disruptions with Network-Wide Analysis", Retrieved at <<http://www.cc.gatech.edu/~jx/reprints/metrics160.pdf>>, In Proceedings of the ACM SIGMETRICS International Conference on Measurement and Modeling of Computer Systems, Jun. 12, 2007, pp. 12.

Johnson, D., "NOC Internal Integrated Trouble Ticket System", Retrieved at <<http://tools.ietf.org/pdf/rfc1297.pdf>>, Jan. 1992, pp. 13.

Kandula, et al., "What's Going on? Learning Communication Rules in Edge Networks", Retrieved at <<http://citeseerx.ist.psu.edu/viewdoc/download?doi=10.1.1.145.3918&rep=rep1&type=pdf>>, In Proceedings of the ACM SIGCOMM Conference on Data Communication, Aug. 17, 2008, pp. 12.

Kandula, et al., "Detailed Diagnosis in Enterprise Networks", Retrieved at <<http://research.microsoft.com/pubs/80590/sigcomm09-395.pdf>>, In Proceedings of the ACM SIGCOMM Conference on Data Communication, Aug. 17, 2009, pp. 12.

Khanna, et al., "Automated Rule-Based Diagnosis through a Distributed Monitor System", Retrieved at <<http://ieeexplore.ieee.org/stamp/stamp.jsp?tp=&arnumber=4358702, In IEEE Transactions on Dependable and Secure Computing, vol. 4, Issue 4, Oct. 2007, pp. 266-279.

Konig, et al., "Reducing the Human Overhead in Text Categorization", Retrieved at <<http://research.microsoft.com/pubs/68150/rtpp139-konig.pdf>>, In Proceedings of the 12th ACM SIGKDD International Conference on Knowledge Discovery and Data Mining, Aug. 20, 2006, pp. 6.

Labovitz, et al., "Experimental Study of Internet Stability and Backbone Failures", Retrieved at <<http://ieeexplore.ieee.org/stamp/stamp.jsp?tp=&arnumber=781062>>, In Proceedings of the Twenty-Ninth Annual International Symposium on Fault-Tolerant Computing, Jun. 15, 1999, pp. 8.

Lim, et al., "A Log Mining Approach to Failure Analysis of Enterprise Telephony Systems", Retrieved at <<http://ieeexplore.ieee.org/stamp/stamp.jsp?arnumber=04630109>>, In IEEE International Conference on Dependable Systems and Networks with FTCS and DCC, Jun. 24, 2008, pp. 6.

Loper, et al., "NLTK: The Natural Language Toolkit", Retrieved at <<http://arxiv.org/pdf/cs/0205028v1.pdf>>, In Proceedings of the Workshop on Effective Tools and Methodologies for Teaching Natural Language Processing and Computational Linguistics, May 17, 2002, pp. 8.

Mackay, David J.C., "Information Theory, Inference, and Learning Algorithms", Retrieved at <<http://www.cs.toronto.edu/~mackay/itprnn/book.pdf>>, In Book of Information Theory, Inference & Learning Algorithms, Oct. 6, 2003, pp. 640.

Manber, et al., "Suffix arrays: A New Method for on-Line String Searches", Retrieved at <<http://webglimpse.net/pubs/suffix.pdf>>, In Proceedings of the First Annual ACM-SIAM Symposium on Discrete Algorithms, Jan. 22, 1990, pp. 16.

Mani, et al., "The Tipster Summac Text Summarization Evaluation", Retrieved at <<http://acl.ldc.upenn.edu/E/E99/E99-1011.pdf>>, In Proceedings of the Ninth Conference on European Chapter of the Association for Computational Linguistics, Jun. 8, 1999, pp. 9.

Manning, et al., "Introduction to Information Retrieval", Retrieved at <<http://www.math.unipd.it/~aiolli/corsi/0910/IR/irbookprint.pdf>>, In Book of Introduction to Information Retrieval, May 27, 2008, pp. 504.

Manning, et al., "Foundations of Statistical Natural Language Processing", Retrieved at <<http://cs.famaf.unc.edu.ar/~laura/llibres/snlp.pdf>>, In Book of Foundations of Statistical Natural Language Processing, Jun. 18, 1999, pp. 704.

Marcus, et al., "Building a Large Annotated Corpus of English: The Penn Treebank", Retrieved at <<http://delivery.acm.org/10.1145/980000/972475/p313-marcus.pdf>>, In Journal of Computational Linguistics—Special Issue on Using Large Corpora, vol. 19, Issue 2, Jun. 1993, pp. 18.

McCallum, et al., "Early Results for Named Entity Recognition with Conditional Random Fields, Feature Induction and Web-Enhanced Lexicons", Retrieved at <<http://people.cs.umass.edu/~mccallum/papers/mccallum-conll2003.pdf>>, In Proceedings of the Seventh Conference on Natural language learning at HLT-NAACL, vol. 4, May 31, 2003, pp. 4.

Medem, et al., "TroubleMiner: Mining Network Trouble Tickets", Retrieved at <<http://ieeexplore.ieee.org/stamp/stamp.jsp?tp=&arnumber=5195946>>, In IFIP/IEEE International Symposium on Integrated Network Management—Workshops, Jun. 1, 2009, pp. 7.

(56) References Cited

OTHER PUBLICATIONS

Melchiors, et al., "Troubleshooting Network Faults Using Past Experience", Retrieved at <<http://ieeexplore.ieee.org/stamp/stamp.jsp?arnumber=00830413>>, In IEEE/IFIP Network Operations and Management Symposium, Apr. 10, 2000, pp. 14.

"SQL Server", Retrieved at <<http://www.microsoft.com/sqlserver/en/us/default.aspx>>, Aug. 8, 2012, pp. 12.

Mitra, et al., "Automatic Text Summarization by Paragraph Extraction", Retrieved at <<http://www.aclweb.org/anthology-new/W/W97/W97-0707.pdf>>, In Proceedings of the Workshop on Intelligent Scalable Summarization at the ACL/EACL Conference, Jul. 7, 1997, pp. 8.

Nagao, et al., "A New Method of N-Gram Statistics for Large Number of N and Automatic Extraction of Words and Phrases from Large Text Data of Japanese", Retrieved at <<http://delivery.acm.org/10.1145/1000000/991994/p611-nagao.pdf>>, In COLING '94 Proceedings of the 15th Conference on Computational linguistics, vol. 1, Aug. 5, 1994, pp. 5.

Noy, et al., "Ontology Development 101: A Guide to Creating Your First Ontology.", Retrieved at <<http://protege.stanford.edu/publications/ontology_development/ontology101.pdf>>, In Technical Report of Stanford Knowledge Systems Laboratory and Stanford Medical Informatics, Mar. 2001, pp. 25.

Paolacci, et al., "Running Experiments on Amazon Mechanical Turk", Retrieved at <<http://repub.eur.nl/res/pub/31983/jdm10630a[1].pdf>>, In Judgment and Decision Making, vol. 5, No. 5, Aug. 2010, pp. 9.

Qiu, et al., "What Happened in My Network? Mining Network Events from Router Syslogs", Retrieved at <<http://conferences.sigcomm.org/imc/2010/papers/p472.pdf>>, In Proceedings of the 10th ACM SIGCOMM Conference on Internet Measurement, Nov. 1, 2010, pp. 13.

Raghavendra, et al., "No Power Struggles: Coordinated Multi-level Power Management for the Data Center", Retrieved at <<http://www.cs.pitt.edu/~kirk/cs3150spring2010/2008_asplos_nopowerstruggles.pdf>>, In ACM SIGOPS Operating Systems Review, vol. 42, Issue 2, Mar. 1, 2008, pp. 12.

Roughan, et al., "IP Forwarding Anomalies and Improving their Detection Using Multiple Data Sources", Retrieved at <<http://citeseerx.ist.psu.edu/viewdoc/download?doi=10.1.1.1.5316&rep=rep1&type=pdf>>, In Proceedings of the ACM SIGCOMM Workshop on Network Troubleshooting, Aug. 30, 2004, pp. 6.

Seemakurty, et al., "Word Sense Disambiguation via Human Computation", Retrieved at <<http://www.cs.cmu.edu/~tomasic/doc/2010/SeemakurtyEtAIHCOMP2010.pdf>>, In Proceedings of the ACM SIGKDD Workshop on Human Computation, Jul. 25, 2010, pp. 4.

Smadja, Frank., "Retrieving Collocations from Text: Xtract", Retrieved at <<http://acl.ldc.upenn.edu/J/J93/J93-1007.pdf>>, In Journal of Computational Linguistics—Special Issue on Using large Corpora, Mar. 1993, pp. 36.

Sorokin, et al., "Utility Data Annotation with Amazon Mechanical Turk", Retrieved at <<http://ieeexplore.ieee.org/stamp/stamp.jsp?tp=&arnumber=4562953>>, In IEEE Computer Society Conference on Computer Vision and Pattern Recognition Workshops, Jun. 23, 2008, pp. 8.

Toutanova, et al., "Enriching the Knowledge Sources Used in a Maximum Entropy Part-of-Speech Tagger", Retrieved at <<http://nlp.stanford.edu/~manning/papers/emnlp2000.pdf>>, In Proceedings of the Joint SIGDAT Conference on Empirical Methods in Natural Language Processing and Very Large Corpora, Oct. 7, 2000, pp. 8.

Turner, et al., "California Fault Lines: Understanding the Causes and Impact of Network Failures", Retrieved at <<http://cseweb.ucsd.edu/~snoeren/papers/cenic-sigcomm10.pdf>>, In ACM SIGCOMM Computer Communication Review, vol. 40, Issue 4, Aug. 30, 2010, pp. 12.

Ukkonen, Esko., "On-Line Construction of Suffix Trees", Retrieved at <<http://www.cs.helsinki.fi/u/ukkonen/SuffixT1withFigs.pdf>>, In Journal of Algorithmica, Sep. 1995, pp. 18.

Ahn, Luis Von., "Games with a Purpose", Retrieved at <<http://www.cs.cmu.edu/~biglou/ieee-gwap.pdf>>, In Computer, Volume, Jun. 2006, pp. 3.

Von Ahn, et al., "Labeling Images with a Computer Game", Retrieved at << http://www.cs.cmu.edu/~biglou/ESP.pdf>>, In Proceedings of the SIGCHI Conference on Human Factors in Computing Systems, Apr. 24, 2004, pp. 8.

Welch, Terry A.., "A Technique for High-Performance Data Compression", Retrieved at <<http://ieeexplore.ieee.org/stamp/stamp.jsp?tp=&arnumber=1659158>>, In Computer, vol. 17, Issue 6, Jun. 1984, pp. 12.

Wu, et al., "Open Information Extraction Using Wikipedia", Retrieved at <<http://www.cs.washington.edu/homes/weld/papers/wu-acl10.pdf>>, In Proceedings of the 48th Annual Meeting of the Association for Computational Linguistics, Jul. 11, 2010, pp. 10.

Xu, et al., "Detecting Large-Scale System Problems by Mining Console Logs", Retrieved at <<http://www.sigops.org/sosp/sosp09/papers/xu-sosp09.pdf>>, In Proceedings of the ACM SIGOPS 22nd Symposium on Operating Systems Principles, Oct. 11, 2009, pp. 16.

Yamamoto, et al., "Using Suffix Arrays to Compute Term Frequency and Document Frequency for All Substrings in a Corpus", Retrieved at <<http://acl.ldc.upenn.edu/J/J01/J01-1001.pdf>>, In Journal of Computational Linguistics, vol. 27, Issue 1, Mar. 2001, pp. 30.

Yamanishi, et al., "Dynamic Syslog Mining for Network Failure Monitoring", Retrieved at <<http://citeseerx.ist.psu.edu/viewdoc/download?doi=10.1.1.96.8083&rep=rep1&type=pdf>>, In Proceedings of the Eleventh ACM SIGKDD International Conference on Knowledge Discovery in Data Mining, Aug. 21, 2005, pp. 10.

Yuan, et al., "SherLog: Error Diagnosis by Connecting Clues from Run-time Logs", Retrieved at <<http://opera.ucsd.edu/paper/asplos10-sherlog.pdf>>, In Newsletter of ACM SIGARCH Computer Architecture News, vol. 38, Issue 1, Mar. 2010, pp. 12.

Zhang, et al., "Extraction of Chinese Compound Words—An Experimental Study on a Very Large Corpus", Retrieved at <<http://acl.ldc.upenn.edu/W/W00/W00-1219.pdf>>, In Proceedings of the Second Workshop on Chinese language Processing, Oct. 2000, pp. 8.

"Jquery", Retrieved at <<http://jquery.com/>>, Retrieved Date: Aug. 7, 2012, p. 1.

Muehlen, et al., "Developing Web Services Choreography Standards Ł The Case of REST vs. SOAP.", Retrieved at <<http://citeseerx.ist.psu.edu/viewdoc/download?doi=10.1.1.80.6494&rep=rep1&type=pdf>>, In Journal of Decision Support Systems—Special Issue, Jul. 2005, pp. 35.

Barco, et al., "Automated Troubleshooting of Mobile Networks Using Bayesian Networks", Retrieved at << http://www.lcc.uma.es/~eva/doc/materiales/barco.pdf >>, Proceedings of the IASTED International Conference Communication Systems and Networks, Sep. 9, 2002, pp. 6.

Behnel, S. et al.; "Cython: C-Extensions for Python"; retrieved at http://cython.org; published 2008; accessed Oct. 31, 2012; 3 pages.

Bos, B, et al.; "Cascading style sheets, level 2 revision 1 CSS 2.1 specification"; W3C working draft; W3C; Jun. 2005; 220 pages.

Ellram, L. et al.; "Total Cost of Ownership: A Key Concept in Strategic Cost Management Decisions"; Journal of Business Logistics; vol. 19, No. 1; 1998; pp. 55-84.

Fruchterman, T. et al.; "Graph drawing by force-directed placement"; Software: Practice and Experience; vol. 21, No. 1 1; Nov. 1991; pp. 1129-1164.

Gruschke, B.; "Integrated event management: Event Correlation Using Dependency Graphs"; Proceedings of the 9th IFIP/IEEE International Workshop on Distributed Systems: Operations & Management (DSOM 98); 1998; 12 pages.

Heim, I.; "Anaphora and Semantic Interpretation: A Reinterpretation of Reinhart's Approach"; MIT Working Papers in Linguistics 25; 1998; pp. 205-246.

Justeson, J. et al.; "Technical terminology: some linguistic properties and an algorithm for identification in text"; Natural Language Engineering; vol. 1, No. 1; 1995; pp. 9-27.

"N-Gram Extraction Tools"; retrieved at http://goo.gl/VNTJa; accessed on Oct. 31, 2012; 3 pages.

(56) References Cited

OTHER PUBLICATIONS

Ziefle, M.; "Effects of display resolution on visual performance"; Human Factors: The Journal of the Human Factors and Ergonomics Society; vol. 40, No. 4; 1998; pp. 554-568.
Bettenburg, et al., "Extracting Structural Information from Bug Reports," ACM International Working Conference on Mining Software Repositories, 2008, 4 pages.
Weight, "Allegiance: How Text Analytics Changes Everything", Retrieved on Apr. 15, 2015, at <<https://www.allegiance.com/documents/text_analytics.pdf>>, 6 pages.
Wu et al., "NetPilot: Automating Datacenter Network Failure Mitigation", Annual Conference of the ACM Special Interest Group on Data Communication, Aug. 13, 2012, 12 pages.
Notice of Allowance mailed Feb. 13, 2015 from U.S. Appl. No. 13/409,111, 8 pages.
Non-Final Office Action mailed Jul. 17, 2015 from U.S. Appl. No. 13/861,857, 16 pages.
Response to International Search Report & Written Opinion filed Sep. 5, 2014 from PCT Patent Application No. PCT/US2013/070327, 13 pages.
Second Written Opinion Mailed Oct. 29, 2014, from the International Preliminary Examining Authority from PCT/US2013/070327, 11 pages.
International Preliminary Report on Patentability mailed Feb. 19, 2015 from PCT Patent Application No. PCT/US2013/070327, 12 pages.
Benson, M., "Collocations and General-Purpose Dictionaries," International Journal of Lexicography, vol. 3, No. 1, 1990, pp. 23-34, 12 pages.
Bettenburg, et al., "Duplicate Bug Reports Considered Harmful Really?" IEEE International Conference on Software Maintenance, 2008, 9 pages.
Aciar, Silvana, "Mining Context Information from Consumer's Reviews", Proceedings of 2nd Workshop on Context-Aware Recommender Systems, Sep. 30, 2010, 5 pages.
Baysal, et al., "A Bug You Like: A Framework for Automated Assignment of Bugs", IEEE 17th International Conference on Program Comprehension, May 17, 2013, 2 pages.
Bhattacharya, et al., "Automated, Highly-Accurate, Bug Assignment Using Machine Learning and Tossing Graphs", Journal of Systems and Software, vol. 85, Issue 10, Oct. 2012, 18 pages.
Brugnoni, et al., "An Expert System for Real Time Fault Diagnosis of the Italian Telecommunications Network," International Symposium on Integrated Network Management, 1993, 13 pages.
Goryachev, et al., "Implementation and Evaluation of Four Different Methods of Negation Detection," Tech. Rep., DSG, 2006, 7 pages.
Goyal, et al., "Streaming for Large Scale NLP: Language Modeling," Annual Conference of the Association for Computational Linguistics, 2009, 9 pages.
Hancock et al., "Next Steps in Signaling (NSIS): Framework," IETF RFC 4080, 2005, 50 pages.
Heafield, K., "Kenlm: Faster and Smaller Language Model Queries," Workshop on Statistical Machine Translation, 2011, 11 pages.
Hooimeijer, et al., "Modeling Bug Report Quality," IEEE/ACM International Conference on Automated Software Engineering, 2007, 10 pages.
Jonsson, et al., "Automated Bug Assignment: Ensemble-based Machine Learning in Large Scale Industrial Contexts", Empirical Software Engineering, (Submitted), 2014, 52 pages.
Just, et al., "Towards the Next Generation of Bug Tracking Systems," IEEE Symposium on Visual Languages and Human-Centric Computing, 2008, Sep. 15-19, 2008, pp. 82-85, 4 pages.
Kittur, et al., "Crowdsourcing User Studies with Mechanical Turk," ACM SIGCHI Conference on Human Factors in Computing Systems, 2008, 4 pages.
Lang, et al., "Enhancing Business Intelligence with Unstructured Data", Proceedings of Conference on Database Systems in Business, Technology and Web, Mar. 2, 2009, pp. 469-485, 17 pages.

Runeson, et al., "Detection of Duplicate Defect Reports Using Natural Language Processing," IEEE International Conference on Software Engineering, 2007, 10 pages.
Non-Final Office Action mailed Sep. 12, 2014 from U.S. Appl. No. 13/409,111, 16 pages.
CodePlex, Project Hosting for Open Source Software, "SharpNPL—Open Source Natural Language Processing Tools", retrieved at https://web.archive.org/web/20120623043531/http://sharpnlp.codeplex.com/, Dec. 13, 2006, 2 pages.
Shokripour, et al., "Automatic Bug Assignment Using Information Extraction Methods", Proceedings of International Conference on Advanced Computer Science Applications and Technologies, Nov. 26, 2012, 6 pages.
Simm, et al., "Classification of Short Text Comments by Sentiment and Actionability for VoiceYourView", Proceedings of IEEE International Conference on Social Computing/IEEE International Conference on Privacy, Security, Risk and Trust, Aug. 20, 2010, pp. 552-557, 6 pages.
Song, et al., "Availability Modeling and Analysis on High Performance Cluster Computing Systems", The First International Conference on Availability, Reliability and Security, Apr. 20, 2006, 8 pages.
Sukumaran, et al., "Integrating Structured and Unstructured Data Using Text Tagging and Annotation", In the Data Administration Newsletter, May 29, 2007, 6 pages.
Amendment filed Sep. 2, 2014 in response to the Final Office Action mailed Jun. 2, 2014 from U.S. Appl. No. 13/409,111, 15 pages.
Second Written Opinion mailed Oct. 29, 2014 from PCT Patent Application No. PCT/US2013/070188, 6 pages.
Response to Second Written Opinion filed Nov. 21, 2014 from U.S. Patent Application No. PCT/US2013/070188, 8 pages.
Kececioglu, D.; "Maintainability, Availability, and Operational Readiness Engineering Handbook", vol. 1, DEStech Publications, Inc., 2002, pp. 24 and 27-29, 4 pages.
Response filed Dec. 11, 2014 to Non-Final Office Action mailed Sep. 9, 2014 from U.S. Appl. No. 13/409,111, 11 pages.
Non-Final Office Action mailed Jan. 16, 2014 from U.S. Appl. No. 13/409,111, 15 pages.
Response filed Apr. 11, 2014 to the Non-Final Office Action mailed Jan. 16, 2014 from U.S. Appl. No. 13/409,111, 14 pages.
Final Office Action mailed Jun. 2, 2014 from U.S. Appl. No. 13/409,111, 15 pages.
Notice of Allowance Mailed Aug. 20, 2014, from U.S. Appl. No. 13/536,782, 5 pages.
Non-Final Office Action Mailed Apr. 18, 2014, from U.S. Appl. No. 13/536,782, 10 pages.
Response filed Jul. 25, 2014 to Non-Final Office Action Mailed Apr. 18, 2014, from U.S. Appl. No. 13/536,782, 12 pages.
Greenberg, et al., "A Clean Slate 4D Approach to Network Control and Management", Retrieved at <<http://www.cs.cmu.edu/~4d/papers/greenberg-ccr05.pdf>>, ACM Sigcomm CCR, 2005, 12 pages.
Guo et al., "BCube: A High Performance, Server-Centric Network Architecture for Modular Data Centers", Retrieved at <<http://research.microsoft.com/pubs/81063/comm136-guo.pdf>>, ACM Sigcomm CCR, 2009, 12 pages.
Hancock et al., "Next Steps in Signaling (NSIS): Framework", Retrieved at <<http://cabernet.tools.ietf.org/pdf/rfc4080.pdf>>, Jun. 2005, pp. 1-49, 50 pages.
Johnson, D., "NOC Internal Integrated Trouble Ticket System", Retrieved at <<http://tools.ietf.org/pdf/rfc1297.pdf>>, Jan. 1992, 13 pages.
Joseph et al., "A Policy-aware Switching Layer for Data Centers", Retrieved at <<http://ccr.sigcomm.org/drupal/files/p51-josephA.pdf>>, in ACM Sigcomm CCR, 2008, pp. 51-62, 12 pages.
Kalchschmidt et al., "Inventory Management in a Multi-Echelon Spare Parts Supply Chain", Retrieved at <<http://read.pudn.com/downloads142/sourcecode/others/617477/inventory%20supply%20chain/04051312322413213(1).pdf>>, Journal of Production Economics, 2003, pp. 397-413, 17 pages.
Kandula et al., "Detailed Diagnosis in Enterprise Networks", Retrieved at <<http://ccr.sigcomm.org/online/files/p243.pdf>>, in ACM Sigcomm CCR, 2009, pp. 243-254, 12 pages.

(56) References Cited

OTHER PUBLICATIONS

Labovitz et al., "Experimental Study of Internet Stability and Backbone Failures", Retrieved at <<http://ieeexplore.ieee.org/stamp/stamp.jsp?tp=&arnumber=781062>>, In Fault-Tolerant Computing, IEEE, 1999, pp. 1-8, 8 pages.
Lockwood, John W., "An Open Platform for Development of Network Processing Modules in Reprogrammable Hardware", Retrieved at <<http://algo-logic.com/~jwlockwd/publications/designcon2001_fpx_platform.pdf>>, IEC DesignConâĂ'Z01, 2001, pp. 1-10, 10 pages.
Markopoulou et al., "Characterization of Failures in an IP Backbone", Retrieved at <<http://ieeexplore.ieee.org/stamp/stamp.jsp?tp=&arnumber=4456903>>, IEEE/ACM Transactions on Networking, vol. 16, No. 4, Aug. 2008, pp. 749-762, 14 pages.
McCloghrie et al., "Management Information Base for Network Management of TCP/IP-based Internets", Retrieved at <<http://www.ietr.org/rfc/rfc1213.txt>>, Mar. 1991, 66 pages.
Mudigonda et al., "NetLord: A Scalable Multi-Tenant Network Architecture for Virtualized Datacenters", Retrieved at <<http://www.hpl.hp.com/personal/Praveen_Yalagandula/papers/SIGCOMM2011-NetLord.pdf>>, In Proceedings of ACM SIGCOMM, 2011, 12 pages.
Mysore et al., "PortLand: A Scalable Fault-Tolerant Layer 2 Data Center Network Fabric", Retrieved at <<http://cseweb.ucsd.edu/~vahdat/papers/portland-sigcomm09.pdf>>, In Proceedings of SIGCOMM CCR, ACM, 2009, 12 pages.
Padmanabhan et al., "A Study of End-to-End Web Access Failures", Retrieved at <<http://citeseerx.ist.psu.edu/viewdoc/download?doi=10.1.1.71.4884&rep=rep1&type=pdf>>, In CoNext. ACM, 2006, 13 pages.
Sekar et al., "The Middlebox Manifesto: Enabling Innovation in Middlebox Deployment", Retrieved at <<http://www.cs.unc.edu/~reiter/papers/2011/HotNets.pdf>>, In Proceedings HotNets, 2011, pp. 1-6, 6 pages.
Shaikh et al., "A Case Study of OSPF Behavior in a Large Enterprise Network", Retrieved at <<http://citeseerx.ist.psu.edu/viewdoc/download?doi=10.1.1.88.8850&rep=rep1&type=pdf>>, In ACM Sigcomm WIM, 2002, 14 pages.
Srisuresh et al., "Middlebox Communication Architecture and Framework", Retrieved at <<http://www.ietf.org/rfc/rfc3303.txt>>, Aug. 2002, 32 pages.
Stiemerling et al., "Middlebox Communication (MIDCOM) Protocol Semantics", Retrieved at <<http://citeseerx.ist.psu.edu/viewdoc/download?doi=10.1.1.182.7835&rep=rep1&type=pdf>>, Mar. 2008, pp. 1-70, 70 pages.
Swale et al., "Middlebox Communications Protocol Requirements", Retrieved at <<http://www.ietf.org/rfc/rfc3304.txt>>, Aug. 2002, pp. 1-9, 9 pages.
"Attensity Text Analytics Software", In Attensity White Paper, Retrieved on: Apr. 15, 2015, 14 pages.
Walfish et al., "Middleboxes No Longer Considered Harmful", Retrieved at <<http://www.usenix.org/event/osdi04/tech/full_papers/walfish/walfish.pdf>>, In Proceedings of SOSDI. USENIX Association, 2004, pp. 215-230, 16 pages.
Watson et al., "Experiences with Monitoring OSPF on a Regional Service Provider Network", Retrieved at <<http://www.eecs.umich.edu/techreports/cse/03/CSE-TR-477-03.pdf>>, In ICDCS. IEEE, 2003, 12 pages.
Harris, Chandler., "Data Center Outages Generate Big Losses", Retrieved at <<http://www.informationweek.com/news/hardware/data_centers/229500121>>, May 12, 2011, 9 pages.
Abu-Libdeh et al., "Symbiotic routing in future data centers", Retrieved at <<http://research.microsoft.com/en-us/um/people/antr/publications/sigcomm10-camcube.pdf>>, Proceedings of SIGCOMM, 2010, Aug. 30-Sep. 3, 2010, 12 pages.
Al-Fares et al., "A scalable, commodity data center network architecture", Retrieved at <<http://ccr.sigcomm.org/online/files/p63-alfares.pdf>>, Proceedings of SIGCOMM, 2008, Aug. 17-22, 2008, pp. 63-74, 12 pages.

Alizadeh et al., "Data Center TCP (DCTCP)". Retrieved at <<http://ccr.sigcomm.org/online/files/p63_0.pdf>>, Proceedings of SIGCOMM, 2010, Aug. 30-Sep. 3, 2010, pp. 63-74, 12 pages.
Bakkaloglu M. et al., "On Correlated Failures in Survivable Storage Systems", Technical Report CMU-CS-02-129, Carnegie Mellon University, Pittsburgh PA, May 2002, 37 pages.
Bansal et al., "Towards Optimal Resource Allocation in Partial-Fault Tolerant Applications", Infocom, 2008, 10 pages.
Benson et al., "Network traffic characteristics of data centers in the wild", Retrieved at <<http://conferences.sigcomm.org/imc/2010/papers/p267.pdf>>, Proceedings of IMC, 2010, Nov. 1-3, 2010, pp. 267-280, 14 pages.
Benson et al., "A first look at problems in the cloud", Retrieved at <<http://www.usenix.org/events/hotcloud10/tech/full_papers/Benson.pdf>>, Proceedings of Hot Cloud, 2010, pp. 1-7, 7 pages.
Potharaju et al., "Demystifying the Dark Side of the Middle: A Field Study of Middlebox Failures in Datacenters", IMC '13, Oct. 23-25, 2013, Barcelona, Span. ACM 2013, 14 pages.
Sherry et al., "Making Middleboxes Someone Else's Problem: Network Processing As a Cloud Service," SIGCOMM, Sep. 24, 2012, 12 pages.
"Why Gmail went down: Google misconfigured load balancing servers," Retrieved at: From Why Gmail went down: Google misconfigured load balancing servers (Updated), Dec. 11, 2012, 4 pages.
Sekar et al., "Design and Implementation of a Consolidated Middlebox Architecture," NSDI, Apr. 25-27, 2012, 14 pages.
Dixon et al., "ETTM: A Scalable Fault Tolerant NetworkManager," NSDI, Mar. 30-Apr. 1, 2011, 14 pages.
Greenhalg et al., "Flow Processing and the Rise of Commodity Network Hardware," ACM SIGCOMM Computer Communication Review, vol. 39, No. 2, Apr. 2009, 7 pages.
Liu et al., "F10: Fault-Tolerant Engineered Networks," USENIX Association 10th USENIX Symposium on Networked Systems Design and Implementation, NSDI, Apr. 3-5, 2013, 14 pages.
Wang et al., "An Untold Story of Middleboxes in Cellular Networks," SIGCOMM'11, Aug. 15-19, 2011, Toronto, Ontario, Canada, 13 pages.
Mann et al., "On a Test of Whether One of Two Random Variables is Stochastically Larger than the Other," The Annals of Mathematical Statistics, vol. 18, No. 1, Mar. 1947, 11 pages.
Potharaju et al., "Juggling the Jigsaw: Towards Automated Problem Inference from Network Trouble Tickets," in 10th USENIX Symposium on Networked Systems Design and Implementation, NSDI, Apr. 3-5, 2013, 15 pages.
Brown, C. E., "Coefficient of Variation," Applied Multivariate Statistics in Geohydrology and Related Sciences 1998, pp. 155-157, 3 pages.
Mahimkar et al., "dFence: Transparent Network-based Denial of Service Mitigation," 4th USENIX Symposium on Networked Systems Design & Implementation, Apr. 11-13, 2007, 25 pages.
Sakia, R., "The Box-Cox Transformation Technique: A Review," The Statistician, Journal of the Royal Statistical Society, Series D, vol. 41, No. 2, 1992, 10 pages.
Bailey et al., "Fitting a Mixture Model by Expectation Maximization to Discover Motifs in Bipolymers," ISMB, Aug. 1994, 33 pages.
Lilliefors, H. W., "On the Kolmogorov-Smirnov Test for Normality with Mean and Variance Unknown," JASA, vol. 62, No. 318, Jun. 1967, 5 pages.
Argyraki et al., "Can Software Routers Scale?" PRESTO'08, Aug. 22, 2008, Seattle, Washington, USA, 6 pages.
Nedevschi et al., "Reducing Network Energy Consumption via Sleeping and Rate-adaptation," NSDI '08: 5th USENIX Symposium on Networked Systems Design USENIX Association and Implementation, Aug. 11, 2008, 14 pages.
Kazemian et al., "Header Space Analysis: Static Checking for Networks," NSDI, Apr. 25, 2012, 14 pages.
Handigol et al., "Where is the Debugger for my Software-defined Network?", Proceedings of the First Workshop on Hot Topics in Software Defined Networks, HotSDN'12, Aug. 13, 2012, Helsinki, Finland, 6 pages.

(56) References Cited

OTHER PUBLICATIONS

Mai et al., "Debugging the Data Plane with Anteater," SIGCOMM'11, Aug. 15-19, 2011, Toronto, Ontario, Canada, 12 pages.
Feamster et al., "Detecting BGP configuration Faults with Static Analysis," 2nd Symposium on Networked Systems Design and Implementation (NSDI), Boston, MA, May 2005, 14 pages.
Feldmann et al., "IP Network Configuration for Intra-domain Traffic Engineering," Network, IEEE, Sep./Oct. 2001, 27 pages.
"Microsoft Assessment and Planning Toolkit", Retrieved at <<http://www.microsoft.com/sam/en/us/map.aspx>>, Sep. 23, 2010, 2 pages.
"Network Management System", Retrieved at <<http://www.cisco.com/en/US/tech/tk869/tk769/technologies_white_paper09186a00800aea9c.shtml#inventorymanage>>, White Paper on Network Management System Best Practices—Cisco Systems, Aug. 9, 2003, 17 pages.
Leland et al., "On the Self-Similar Nature of Ethernet Traffic (extended version)," IEEE/ACM Transaction on Networking, vol. 2, No. 1, Feb. 1994, 15 pages.
Moon, T. K., "The Expectation-Maximization Algorithm," IEEE Signal Processing Magazine, Nov. 1996, 14 pages.
Bendel et al., "Comparison of Skewness Coefficient, Coefficient of Variation, and GiniCoefficient as Inequality Measures within Populations," Oecologia, vol. 78, Issue 3, Mar. 1989, 7 pages.
"2011 ADC Security Survey Global Findings," Retrieved at: http://www.slideshare.net/f5dotcom/2011-f5-adc-security-survey-global-slide-share, on Nov. 4, 2011, 10 pages.
Scharf et al., "MP-TCP Application Interface Considerations," Nov. 29, 2010, 26 pages.
"Cisco Data Center Network Architecture," http://www.cisco.com/c/dam/en/us/solutions/collateral/data-center-virtualization/net_brochure0900aecd80404988.pdf, 2006, 2 pages.
Response filed Sep. 5, 2014 to International Search Report and Written Opinion: Article 34 Demand from PCT Patent Application No. PCT/US2013/070188, 9 pages.
Non-Final Office Action mailed Feb. 4, 2015 from U.S. Appl. No. 13/677,302, 17 pages.
Notice of Allowance mailed Jun. 19, 2015 from U.S. Appl. No. 13/924,452, 8 pages.
Gill et al., "Understanding Network Failures in Data Centers: Measurement, Analysis, and Implications", Retrieved at <<http://www.cs.uccs.edu/~zbo/teaching/CS522/Projects/SIGCOMM11-DCFailure.pdf>>, In Proceedings of SIGCOMM, 2011, pp. 350-361, 12 pages.
Greenberg et al., "VI2: A Scalable and Flexible Data Center Network", Retrieved at <<http://www.cs.cmu.edu/afs/.cs.cmu.edu/Web/People/prs/15-744-F11/papers/vl2.pdf, ACM SIGCOMM CCR, 2009, 12 pages.
Response filed May 4, 2015 to Non-Final Office Action mailed Feb. 4, 2015 from U.S. Appl. No. 13/677,302, 13 pages.
Notice of Allowance mailed Aug. 5, 2015 from U.S. Appl. No. 13/677,302, 15 pages.
International Search Report & Written Opinion mailed May 19, 2014 from PCT Patent Application No. PCT/US2013/070188, 17 pages.
Notice of Allowance mailed Feb. 17, 2015 from U.S. Appl. No. 13/536,782, 6 pages.
Notice of Allowance mailed Aug. 5, 2015 from U.S. Appl. No. 13/536,782, 6 pages.
Wundsam et al., "OFRewind: Enabling Record and Replay Troubleshooting for Networks", Retrieved at <<http:// www.usenix.org/event/atc11/tech/final_files/Wundsam.pdf>>, USENIXATC'11 Proceedings of the 2011 USENIX conference on USENIX annual technical conference, 2011, pp. 1-14, 14 pages.
"A Practitioner's Guide to More Efficient Network Management", Retrieved at <<http://h10124.www1.hp.com/campaigns/us/en/software/images/Practitioners_Guide.pdf>>, Retrieved Date: Feb. 8, 2012, 8 pages.
"Enterprise Network and Data Security Spending Shows Remarkable Resilience", Retrieved at <<http://www.abiresearch.com/press/3591-Enterprise+Network+and+Data+Security+Spending+Shows+Remarkable+Resilience>>, Jan. 2011, 5 pages.
Allman, Mark., "On the Performance of Middleboxes", Retrieved at <<http://citeseerx.ist.psu.edu/viewdoc/download?doi=10.1.1.77.9560&rep=rep1&type=pdf>>, In Proceedings of SIGCOMM IMC. ACM, 2003, 6 pages.
Biggadike et al., "Natblaster: Establishing TCP Connections between Hosts Behind NATs", Retrieved at <<http://sparrow.ece.cmu.edu/~adrian/projects/natblaster.pdf>>, In ACM SIGCOMM Workshop, 2005, 10 pages.
Carpenter, B., "Middleboxes: Taxonomy and Issues", Retrieved at <<http://tools.ietf.org/pdf/rfc3234.pdf>>, Feb. 2002, pp. 1-27, 27 pages.
Casado et al., "Ethane: Taking Control of the Enterprise", Retrieved at <<http://yuba.stanford.edu/~casado/ethane-sigcomm07.pdf>>, ACM SIGCOMM CCR, 2007, 12 pages.
Case et al., "A Simple Network Management Protocol", Retrieved at <<http://www.ietf.org/rfc/rfc1157.txt>>, May 1990, 34 pages.
Eppinger, Jeffrey., "TCP Connections for P2P Apps: A Software Approach to Solving the NAT Problem", Retrieved at <<http://reports-archive.adm.cs.cmu.edu/anon/isri2005/CMU-ISRI-05-104.pdf>>, CMU-ISRI-05-104, Jan. 2005, pp. 1-8, 8 pages.
"Better Predict and Prevent Network Failure—Monolith Software for Network Management", Retrieved at <<http://www.monolith-software.com/solutions/network-management.php>>, Retrieved Date: Oct. 19, 2011, 2 pages.
Brodkin, Jon, "Amazon EC2 outage calls 'availability zones' into question", Retrieved at <<http://www.networkworld.com/news/2011/042111-amazon-ec2-zones.html>>, Apr. 21, 2011, 8 pages.
Chen et al., "Declarative Configuration Management for Complex and Dynamic Networks", Retrieved at <<http://www2.research.att.com/~kobus/docs/coolaid.pdf>>, Proceedings of CoNEXT, Nov. 30-Dec. 3, 2010, 12 pages.
"Cisco Systems, White Paper: Data Center Switching Solutions," Retrieved at <<http://www.cisco.com/en/US/solutions/collateral/ns340/ns517/ns224/ns668/>>, Mar. 2004, 15 pages.
"Cisco: UniDirectional Link Detection (UDLD)", Retrieved at <<http://www.cisco.com/en/US/tech/tk866/tsd_technology_support_subprotocol_home.html>>, 2 pages.
"EMC Ionix Application Discovery Manager", Retrieved at <<http://www.emc.com/collateral/software/data-sheet/h2365-ionix-adm-ds.pdf>>, Proceedings of ICIDS 2008, Retrieved Date: Oct. 19, 2011, 5 pages.
"Enterprise Feedback Management", Published on: Jun. 30, 2012 Available at: <<http://www.forumresearch.com/services-enterprise-feedback-management.asp>>, 2 pages.
Greenberg et al., "Towards a Next Generation Data Center Architecture: Scalability and Commoditization", Proceedings of the ACM Workshop on Programmable Routers for Extensible Services of Tomorrow, Aug. 22, 2008, pp. 57-62, 6 pages.
Guo et al., "DCell: A Scalable and Fault-Tolerant Network Structure for Data Centers", Proceedings of the ACM SIGCOMM Conference on Data Communication, Aug. 17, 2008, pp. 75-86, 12 pages.
Gyarmati et al., "Scafida: A Scale-Free Network Inspired Data Center Architecture", ACM SIGCOMM Computer Communication Review, vol. 40, Issue 5, Oct. 2010, pp. 4-12, 8 pages.
Kim et al., "Floodless in Seattle: A Scalable Ethernet Architecture for Large Enterprises", Proceedings of SIGCOMM, 2008, Aug. 17-22, 2008, 12 pages.
McKeown et al., "Openflow: Enabling Innovation in Campus Networks", Proceedings of SIGCOMM CCR, Mar. 14, 2008, 6 pages.
Meykar, Orest, "Definitions of Effectiveness Terms: A Report on the Purpose and Contents of MIL-STD-721B"; IEEE Transactions on Aerospace and Electronic Systems, vol. AES3, No. 2, Mar. 1967, pp. 165-170, 6 pages.
"Military Standard, Definitions of Terms for Reliability and Maintainability," Jun. 12, 1981, Department of Defense, Washington, D.C., 18 pages.

(56) References Cited

OTHER PUBLICATIONS

O'Connor et al., "Practical Reliability Engineering", Wiley & Sons, 2012, pp. 147, 431, and 1, 3 pages.
Schroeder et al., "Disk Failures in the Real World: What Does an MTTF of 1,000,000 Hours Mean to You?", Proceedings of FAST '07: 5th USENIX Conference on File and Storage Technologies, pp. 1-16, 16 pages.
Schroeder et al., "DRAM Errors in the Wild: A Large-scale Field Study", Proceedings of SIGMETRICS, Jun. 15-19, 2009, 12 pages.
"Security Information & Event Manager (SIEM)", Retrieved at <<http://www.enterasys.com/company/literature/siem-ds.pdf>>, on Oct. 19, 2011, 7 pages.
Singh et al., "DYSWIS: An Architecture for Automated Diagnosis of Networks", Retrieved at <<http://www.cs.columbia.edu/~vs2140/DYSWIS.pdf>>, May 1-10, 2011, 8 pages.
"Spanning Tree Protocol Root Guard Enhancement", Retrieved at <<http://www.cisco.com/application/pdf/paws/10588/74.pdf>>, on Feb. 15, 2012, 6 pages.
Tang et al., "Analysis and Modeling of Correlated Failures in Multicomputer Systems", IEEE Transactions on Computers, vol. 41, No. 5, May 1992, 11 pages.
Thottan et al., "Anomaly Detection in IP Networks", Proceedings of IEEE Transactions on Signal Processing, vol. 51, No. 8, Aug. 2003, pp. 2191-2204, 14 pages.
Vishwanath et al., "Characterizing Cloud Computing Hardware Reliability", Proceedings of Symposium on Cloud Computing (SOCC), Jun. 10-11, 2010, 11 pages.
Wang et al., "MCube A High Performance and Fault-Tolerant Network Architecture for Data Centers", International Conference on Computer Design and Applications, Jun. 25, 2010, 5 pages.
Notice of Allowance mailed Sep. 14, 2015 from U.S. Appl. No. 13/924,452, 7 pages.
Response filed Sep. 22, 2015 to Non-Final Office Action mailed Jul. 17, 2015 from U.S. Appl. No. 13/861,857, 11 pages.
Notice of Allowance mailed Nov. 3, 2015 from U.S. Appl. No. 13/536,782, 6 pages.
Voluntary Amendments filed Nov. 13, 2015 from China Patent Application No. 201380059928.0, 12 pages.

* cited by examiner

SUPPORT TICKET 1411(1)

Incident Ticket (#112378 – Closed)

Ticket Title:
Net Device: A27
Load Balancer Down 100%
Summary: Load balancer failed and power supply was replaced.

| Problem Type: | Server overload | Last Modified User: | J-doe |
|---|---|---|---|
| Created Date: | November 11, 2010 | Last Modified Date: | November 13, 2010 4:45 PM |
| Created Time: | 3:47 PM | Action Required By: | N/A – ticket closed |
| Created By User: | R. Smith | Closed By Team: | IT Solutions Team 4 |
| Created By Team: | Triage Team 3 | Closed Date: | November 13, 2010 |
| Ticket Priority: | 3 | Closed Time: | 6:12 PM |
| Team Assigned: | IT Solutions Team 4 | Alarms: | 2 |
| Assigned Member: | J-doe | Attachments: | 1 diary entry |

FIG. 3

DIARY ENTRY 400

| Diary Title | Actions Performed Diary Entry – November 13, 2010 |||
|---|---|---|---|
| | Instant messaging with network engineer J. Doe |||
| Diary Type: | IM | Action Required By: | N/A – ticket closed |
| Created By: | R. Smith | Closed By Team: | IT Solutions Team 4 |
| Last Updated By: | R. Smith | Closed Date: | 12/17/110 02:14:35 |
| Diary Assigned Team: | Triage Team 3 | Parent/Master Ticket: | 112378 |
| Diary Description : | 23:05 J. Doe (IT Solutions) ok<br>Both power supplies have been reseated<br>This conversation is being saved in your Outlook Inbox Folder.<br>23:09 J. Doe (IT Solutions) The load balancer has been powered back up and it does not appear that it has come back online.<br>Please advise<br>23:19 J. Doe (IT Solutions) Issue resolved by replacing one of the power supplies, I am sending the ticket back with findings<br>23:49 R. Smith (Consultancy Services) ok looks good, thank you. I will close the ticket. |||

401 (Diary Title area)
402 (Diary Description area)

FIG. 4

PROBLEM INFERENCE FROM SUPPORT TICKETS

BACKGROUND

Reliable datacenters and associated networks are useful to various applications, including the delivery of cloud services. However, mitigating a network failure can be a very challenging task, as the root cause of a given network failure is not always apparent to network engineers. Conventionally, network engineers may learn from experience or formal training how to deal with particular types of network failures. However, even formally-trained network engineers with years of experience may take a relatively long time (e.g., days) to diagnose and repair certain failures.

When working on a particular failure, network engineers may use support tickets to track steps taken to diagnose and mitigate problems. However, these tickets often include large amounts of relatively unstructured data including free form text, device logs, automated messages, email conversations, etc. Some tickets can grow very large, and may even have on the order of one million words. In view of these characteristics of support tickets, it can be very difficult for even skilled network engineers to discern, from support tickets, how to troubleshoot associated network failures.

SUMMARY

This document relates to processing electronic data. One implementation is manifested as a technique that can include obtaining a plurality of documents. The plurality of documents can have corresponding text. The technique can also include performing phrase extraction on the text to obtain a plurality of phrases that appear in the text, and filtering out some phrases from the plurality of phrases based on one or more criteria to obtain a subset of the plurality of phrases. The technique can also include mapping individual phrases from the subset of phrases to classes of an ontology model and storing the individual phrases in a knowledge base. The technique can also include analyzing an individual document by applying the classes of the ontology model to occurrences of the phrases in the individual document to infer at least one concept expressed by the individual document, and generating output reflecting the at least one concept expressed by the individual document. The technique can also include performing incremental learning by updating the knowledge base with a new phrase identified in the individual document. At least the phrase extraction can be performed using a computing device.

Another implementation is manifested as one or more computer-readable memory devices or storage devices that can include instructions which, when executed by one or more processing devices, cause the one or more processing devices to perform acts. The acts can include identifying occurrences of phrases in a support ticket, wherein the support ticket includes text describing troubleshooting steps taken by one or more network engineers to resolve one or more network problems. The acts can also include inferring, from the occurrences, one or more concepts expressed by the text of the support ticket.

Another implementation is manifested as a system that can include an inference engine and one or more processing devices configured to execute the inference engine. The inference engine can be configured to perform automated detection of concepts expressed in failure logs. The failure logs can include unstructured data.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 3 and 4 show exemplary documents in accordance with some implementations of the present concepts.

DETAILED DESCRIPTION

Overview

Figure 1:
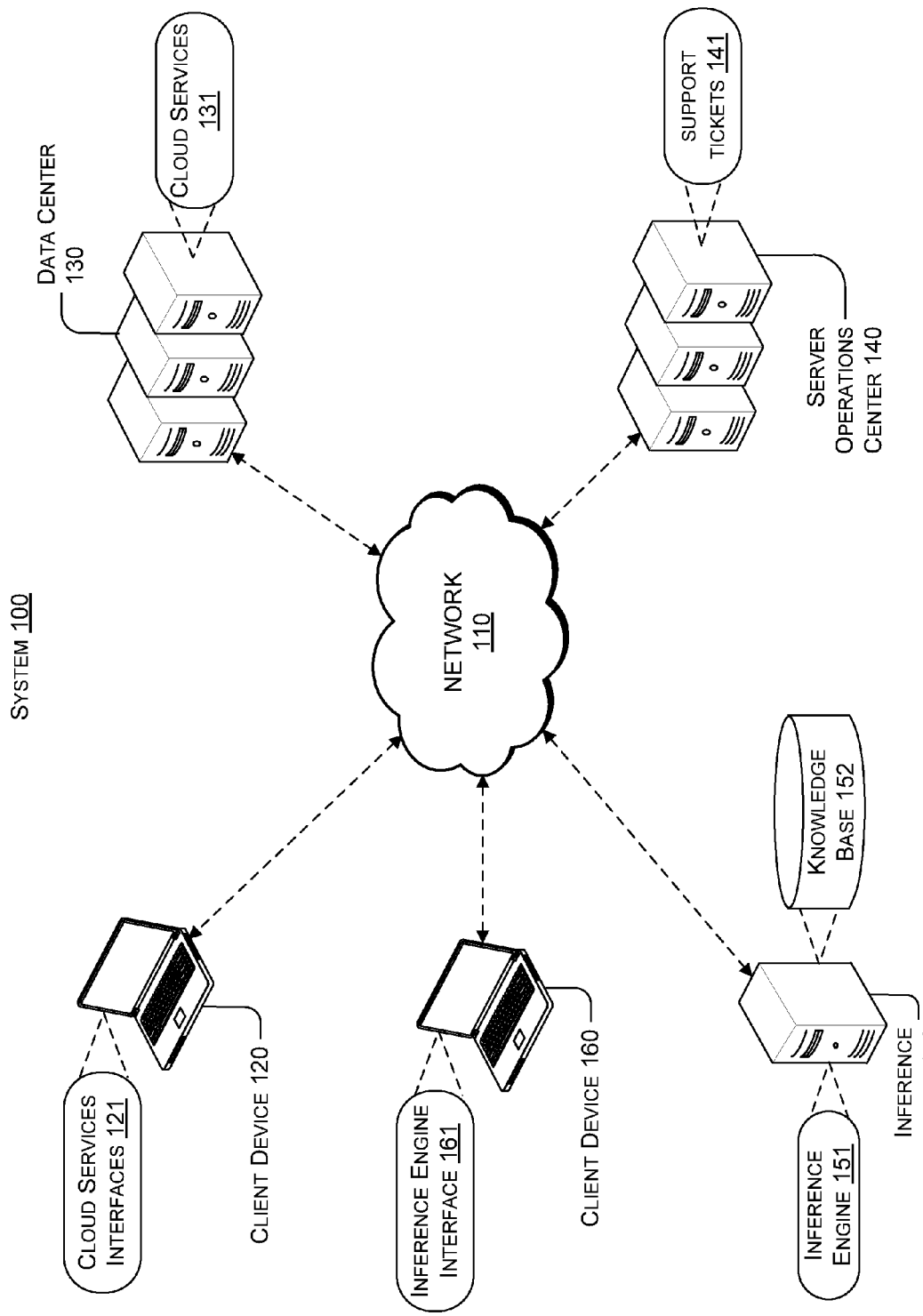
FIG. 1 shows an example of an operating environment in accordance with some implementations of the present concepts.

This document relates to analysis of data, and more particularly to performing automated inference of concepts expressed in documents. One specific implementation includes performing automated inference of concepts expressed in failure logs, such as support tickets for troubleshooting problems on an electronic network. Generally, an inference engine can evaluate failure logs to infer concepts associated with individual failures as well as trends across multiple failures. For example, the inference engine can infer, from an individual support ticket, that a particular device component or configuration was a likely cause of a particular failure, e.g., a faulty power supply for a load balancer or a faulty configuration of a router. The inference engine can also identify trends across multiple support tickets, e.g., a particular brand or model of device may exhibit a relatively high failure rate relative to other comparable devices, such as a specific brand and model of load balancer or router relative to other brands/models of routers or load balancers. As another example of a trend that can be inferred from multiple support tickets, a particular device configuration may be associated with particular types of failures.

As used, the term "document" refers to a collection of one or more words, and includes both electronic and physical documents. In the context of an electronic document, the term can encompass the combination of human-language words along with metadata, e.g., as in the case of a word processing document or spreadsheet document. The term "failure log" refers to a particular type of document that includes information related to a failure of some type, e.g., a device failure on a network. Examples of failure logs can include support tickets and associated diary entries, network event logs (e.g., identifying a link that is down), traffic logs (e.g., network traffic logged by a device), system logs (e.g., maintained by a server), etc. Generally speaking, a failure log can include device-generated text such as automated logging messages by the device having the failure or another device (e.g., a server computer affected by a failed router). A failure log can also include human-generated text, e.g., text written by a network engineer describing symptoms of a failure, troubleshooting steps, actions taken to mitigate a failure, etc.

One particular example of a failure log is a network support ticket, which is a document that can be used to track a failure in a network setting from when the problem is detected until the problem is resolved. Network support tickets can include certain automated fields that are auto-filled by software that generates the tickets, e.g., each field can be populated by the software with particular data values that relate to the failure. Network support tickets can also include unstructured data, such as freeform text produced by humans communicating about the problem and/or logging messages generated by one or more devices. As discussed in more detail below, the disclosed implementations can be viewed as leveraging this unstructured data to automatically infer various concepts, e.g., individual problems, actions, and activities inferred from an individual support ticket and trends associated with the network failures inferred using multiple support tickets.

Example System

For purposes of explanation, consider introductory FIG. 1, which shows an exemplary system 100 that is consistent with the disclosed implementations. As shown in FIG. 1, system 100 includes a network 110 connecting numerous devices, such as a client device 120 and a data center 130. Generally speaking, data center 130 can include one or more server devices that host cloud services 131, e.g., cloud-based applications provided by the data center 130 to client devices such as client device 120. These cloud-based applications can provide various services to client device 120, such as storage, email, streaming media, and personal information management (e.g., calendars, contacts, etc.). Client device 120 may access cloud services 131 via one or more cloud interfaces 121, e.g., one or more application programming interfaces (APIs) that make calls to the cloud services.

Network 110 can also connect a server operations center 140 to data center 130. Server operations center 140 can generally include one or more server devices configured to monitor data center 130 for network problems. For example, the server operations center may allow network engineers to monitor status of the data center for various failures, e.g., a failed router, improper device configuration, slow response times, etc. As the network engineers address various problems in the data center, they may generate support tickets 141. Individual support tickets may generally include information about problems within the data center from multiple sources. For example, as mentioned above, support tickets can include both structured data populated by the server devices as well as unstructured data such as text written by individual network engineers and/or automated messages logged by one or more devices.

Network 110 can also connect an inference server 150, which may host an inference engine 151 and a knowledge base 152. Generally speaking, the inference engine can be configured to process support tickets 141 to infer various concepts from the support tickets. For example, the inference engine may identify concepts such as problems, actions, or activities expressed in the support tickets. The inference engine may also identify trends over multiple support tickets such as failures associated with a particular model of device or a particular device configuration. The inference engine may process the support tickets using information stored in the knowledge base, as discussed in more detail below. The knowledge base may be implemented using various storage devices, e.g., optical drives, flash drives, magnetic hard drives, etc.

Network 110 can also connect a client device 160, which can include an inference engine interface 161 configured to communicate with inference server 150. For example, the inference engine interface may comprise a browser that receives and displays visualizations reflecting the inferences made by the inference server, and client device 160 may display the visualizations to a user of client device 160. Thus, client device 160 may be used by a network engineer to help troubleshoot various problems that may arise in data center 130. Inference engine interface 161 may also be configured to operate on other, e.g., non-visual, forms of output by querying the inference server using one or more application programming interfaces to obtain output from the inference engine.

Note that the various devices shown in system 100 are illustrated with respect to logical roles that can be performed by the devices in operation of system 100. However, the geographical locations of the various devices are not necessarily reflected by system 100. For example, client device 160 can be located on-site at server operations center 140, e.g., a desktop computer used by a network engineer during day-to-day operation of the server operations center. Alternatively, as shown in FIG. 1, client device 160 can be embodied as a mobile device, e.g., laptop, tablet, mobile phone, etc., that can be used by a network engineer remotely from the server operations center. More generally, the various functionality discussed herein with respect to each device shown in FIG. 1 can be performed by other device classes, e.g., server functionality can be performed by mobile devices and so on.

Also note that server operations center 140 and data center 130 are illustrated as multiple server devices whereas inference server 150 and client devices 120 and 160 are illustrated as individual computing devices. This reflects one particular implementation, and other implementations may provide inference server functionality and/or client device functionality as discussed herein via multiple devices. Likewise, server operations center and/or data center functionality as discussed herein may be performed by individual devices.

Further note that, in practice, there may be additional instances of each computing device mentioned herein, e.g., additional inference servers, server operations centers, client devices, and data centers. As discussed in more detail below, each of the computing device(s) 120, 130, 140, 150, and/or 160 shown in FIG. 1 can include one or more processing devices, such as computer processors, executing instructions stored on one or more computer-readable storage media such as volatile or non-volatile memories, optical disks, hard drives, flash drives, etc.

Example Inference Server

Figure 2:
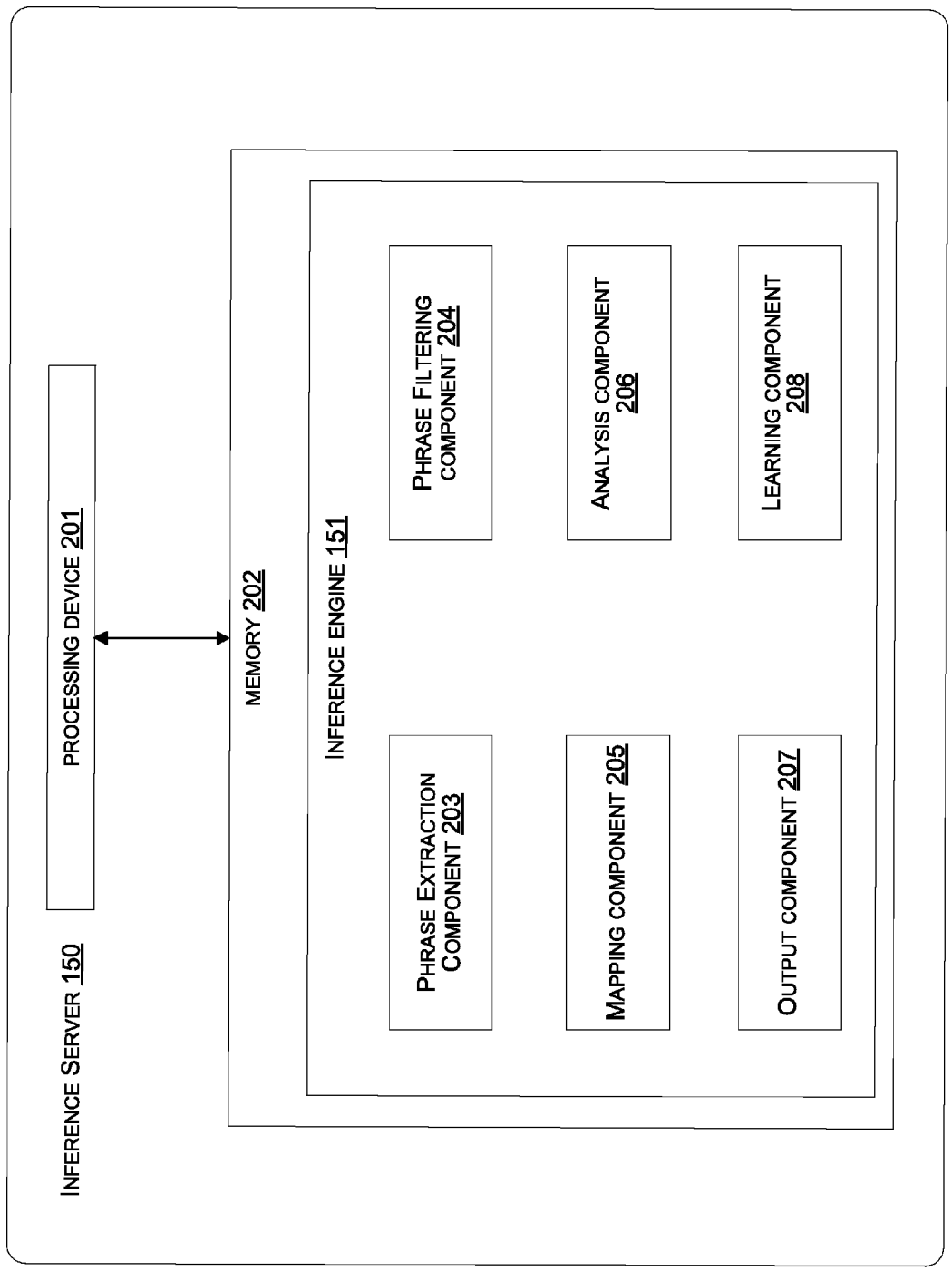
FIG. 2 shows exemplary components of a device in accordance with some implementations of the present concepts.

FIG. 2 shows an exemplary architecture of inference server 150 that is configured to accomplish the concepts described above and below. The inference server can include a processing device 201 that is operably connected to a memory 202 via a bus. Processing device 201 can represent, e.g., one or more central processing units, microprocessors, multi-core processors, etc. The processing device can use architectures such as a reduced instruction set computing (RISC) architecture (e.g., ARM or advanced RISC machine) or a complex instruction set computing (CISC) architecture (e.g., x86).

Memory 202 can be a volatile storage device such as a random access memory (RAM), or a non-volatile storage device such as FLASH memory. Although not shown in FIG. 2, inference server 150 can also include various input/output devices, e.g., a keyboard, a mouse, a display, a printer, microphone for voice input, touch screen for gesture or touch input, etc. Furthermore, the analysis server can include one or more non-volatile storage devices, such as a hard disc drive (HDD), optical (compact disc/digital video disc) drive, tape drive, etc. (for example, knowledge base 152). Generally speaking, any data processed by the inference server can be stored in memory 202, and can also be committed to non-volatile storage.

Memory 202 of inference server 150 can include various components that implement certain processing described herein. For example, memory 202 can include inference engine 151, which can include various modules/components. For example, inference engine 151 can include a phrase extraction component 203, a phrase filtering component 204, a mapping component 205, an analysis component 206, an output component 207, and a learning component 208. The individual components can perform certain processing disclosed herein, e.g., example methods and associated processing discussed in more detail below. For example, the individual components can perform certain processing on support tickets 141 obtained from server operations center 140 to infer concepts from the support tickets. The inferred concepts can be used to identify root causes of individual problems and/or problem trends within the data center 130.

Phrase extraction component 203 can be configured to identify various phrases (e.g., n-grams) that may appear in the support tickets. For example, the phrases can be repeated patterns of language, e.g., n-grams of length one or more that appear in multiple instances in the support tickets. As discussed in more detail below, the phrase extraction component can apply a two-pass phrase extraction technique to obtain a frequency estimate of n-grams in the support tickets.

Phrase filtering component 204 can be configured to filter the extracted phrases to identify a subset of the phrases that have relatively significant meaning, e.g., contribute to understanding the "central topic" of text. Generally speaking, the phrase filtering component can apply filtering to the phrases identified by the phrase extraction component 203 to eliminate certain phrases, e.g., using the frequencies estimated by phrase extraction component 203 or other criteria. The phrase filtering component can also apply information theoretic measures to perform filtering based on computed importance of the n-grams.

Mapping component 205 can be configured to map individual phrases to an ontology model. For example, an individual such as a domain expert or network engineer may classify individual phrases into individual ontology classes and subclasses. The ontology model can be constructed to relate the various ontology classes and subclasses according to defined interactions and can be stored in the knowledge base 152.

Analysis component 206 can be configured to identify concepts expressed in the support tickets. Analysis component 206 can identify these concepts by identifying what problems were seen in individual tickets, what actions were taken to mitigate the problems, other related activities by the network engineers, etc. For example, using various grammar patterns, concepts can be extracted based on the ontology classes mentioned above.

Output component 207 can be configured to generate various forms of output that represent the processing by the analysis component 206. For example, the output component can generate various visualizations, e.g., graphical interfaces, that reflect concepts inferred by the analysis component. The graphical interfaces may reflect root causes of problems of individual support tickets and/or trends across multiple support tickets. As discussed in more detail below, the output component may provide menu selections to filter by device type, device model (e.g., multiple models per device type), or other fields to identify particular traits of devices that are obtained from the support tickets. The output component may also implement a queryable application programming interface (API) to allow other components (e.g., third-party software) to access the output.

Generally speaking, components 151 and 203-208 can include instructions stored in memory 202 that can be read and executed by processing device 201. Components 151 and 203-208 can also be stored in non-volatile storage and retrieved to memory 202 to implement the processing described herein. As used herein, the term "computer-readable media" can include transitory and non-transitory instructions. In contrast, the term "computer-readable storage media" excludes transitory instances, and includes volatile or non-volatile hardware memory devices and/or hardware storage devices such as those discussed above with respect to memory 202 and/or other suitable storage technologies, e.g., optical disk, hard drive, flash drive, etc.

In some alternative configurations, the techniques disclosed herein can be implemented on one or more computers that use a system on a chip (SOC) type design. In such a case, functionality provided by various components, e.g., 151 and 203-208 can be integrated on a single SOC or multiple coupled SOCs. In one such example, individual computers can include shared resources and dedicated resources. One or more interfaces can facilitate communication between the shared resources and the dedicated resources. As the name implies, dedicated resources can be thought of as including individual portions that are dedicated to achieving specific functionalities. Shared resources can be storage, processing devices, etc., that can be used by multiple functionalities.

Example Support Ticket and Diary Entry

FIG. 3 shows an example support ticket 141(1), e.g., an individual document that can be obtained by inference server 150 from server operations center 140. Support ticket 141(1) includes various sections relating to a particular problem in the data center. For example, support ticket 141(1) includes a ticket number section 301 that includes an identifier (e.g., a unique identifier) of an incident in the data center, e.g., 112378, as well as a ticket status of "Closed." Ticket title section 302 includes a summary of the incident, including text that indicates a load balancer failed and the power supply for the load balancer was replaced. Ticket data section 303 includes various data fields pertinent to the ticket, e.g., assigned network engineer or "member," the user who created the ticket, when the ticket was created, when the ticket was closed (e.g., the incident was resolved), etc.

FIG. 4 shows an example diary entry 400 associated with support ticket 141(1). Diary entry 400 generally reflects communications between multiple engineers relating to support ticket 141(1). For example, diary title section 401 indicates that this diary entry is an instant messenger session with a particular network engineer, J. Doe. Diary description section 402 includes text reflecting instant messenger communications between engineer J. Doe and an individual named R. Smith. For example, J. Doe may be on-site at data center 130 trying to resolve a problem with a load balancer, whereas R. Smith may be at server operations center 140 monitoring the progress of the issue. Support ticket number 112378 may have been assigned when support ticket 141(1) was initiated at the server operations center to address problems within the data center, and diary entry 400 may have subsequently been associated with support ticket 141(1) during J. Doe's efforts to resolve the issue with the load balancer.

Considering both support ticket 141(1) and diary entry 400, note that certain information is reflected in relatively less structured formats than other information. For example, ticket data section 303 of support ticket 141(1) includes numerous specific fields that can be represented directly, e.g., by corresponding database entries that compactly represent the knowledge included therein. In contrast, ticket title section 302 includes relatively less structured information, including the sentence "Load balancer failed and power supply was replaced." Similarly, the diary description section includes relatively unstructured information, e.g., freeform textual communication between multiple individuals.

To a trained human, e.g., a network engineer, the sentence "Load balancer failed and power supply was replaced" may convey a great deal of meaning about the root cause of the incident, e.g., the power supply for a load balancer was found to be faulty and replacing the power supply resolved the incident. However, this knowledge is represented in a relatively unstructured format. Generally speaking, inference engine 151 can process relatively unstructured data such as ticket title section 302 and/or diary description section 402 to infer various concepts, e.g., problems such as a load balancer failed, actions such as replacing the power supply, and activities such as reseating the power supply to diagnose the problem.

As mentioned, diary description section 402 also includes relatively unstructured information, e.g., an instant messaging conversation between two individuals. Again, a trained human such as a network engineer can read the instant messaging conversation and recognize that certain activities were performed, e.g., J. Doe reseated two power supplies and powered the load balancer back up but the problem was not resolved until one of the power supplies was replaced. Using the disclosed techniques, inference engine 151 can process relatively unstructured data such as diary description section 402 to infer certain problems, actions, and activities expressed in diary entry 400.

Example Method

Figure 5:
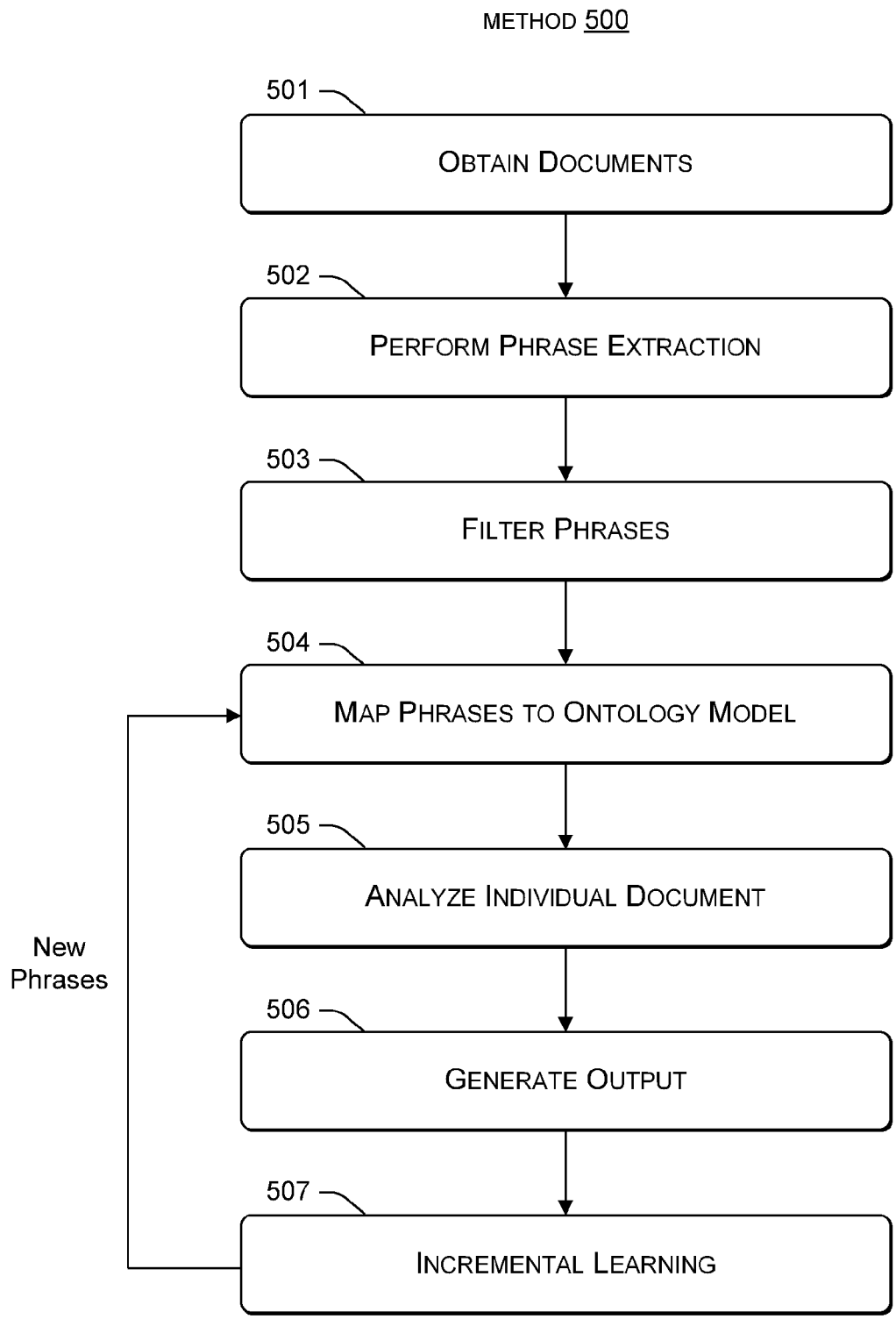
FIGS. 5-7 and 9 show flowcharts of exemplary methods that can be accomplished in accordance with some implementations of the present concepts.

FIG. 5 illustrates an exemplary method 500 for inferring concepts from documents that is suitable for implementation in system 100 or other systems. Inference engine 151 of inference server 150 can implement method 500, as discussed below. For example, the inference engine can use method 500 to perform automated detection of causes of network problems from documents, e.g., failure logs such as support tickets and/or diary entries. Note that method 500 is discussed herein as being implemented on the inference server for exemplary purposes, but is suitable for implementation on many different types of devices.

Method 500 can begin at block 501, where documents are obtained. For example, inference server 150 can obtain one or more of the support tickets 141 from server operations center 140. In some implementations, the inference server can also obtain one or more associated diary entries. For example, the inference server can obtain one or more existing tickets that have already been opened (and possibly closed).

Next, at block 502, phrase extraction can be performed on text in the documents to obtain a plurality of phrases that appear in the text of the documents. Block 502 can also include determining a relative frequency with which each phrase appears in the documents. For example, phrases that appear multiple times in the existing tickets and/or diary entries can be extracted at block 502. Additional detail relating to block 502 is discussed further below in the section entitled "PHRASE EXTRACTION."

Next, at block 503, the extracted phrases can be filtered using one or more criteria. For example, a first filter can filter the phrases based on phrase length and/or frequency, a second filter can filter the phrases using part-of-speech patterns, and a third filter can filter the phrases using one or more information theoretic measures. After the filtering, the remaining phrases (e.g., a subset of the extracted phrases) can be processed further. Additional detail relating to block 503 is discussed further below in the section entitled "PHRASE FILTERING."

Next, at block 504, individual phrases from the remaining subset can be mapped to classes of an ontology model. For example, the ontology model can include various classes, e.g., "actions" such as cleaning a fiber cable and/or "entities" such as devices, etc. The ontology model can be used to express relationships between the different classes, which can in turn provide for concise expression of pertinent information included in the documents. The mapping of the phrases to the ontology model can be stored in the knowledge base 152. Additional detail relating to block 504 is discussed further below in the section entitled "PHRASE MAPPING."

Next, at block 505, a document can be analyzed using the ontology model. For example, an individual (e.g., recent or new) support ticket can be identified for analysis and processed to identify occurrences of the phrases that are included in the ontology. The ontological classes assigned to the phrases can be applied to the occurrences of the phrases to identify certain concepts reflected by the individual support ticket. Additional detail relating to block 505 is discussed further below in the section entitled "DOCUMENT ANALYSIS."

Next, at block 506, output can be generated that reflects concepts identified by the analysis of the document. For example, the output can be provided via one or more application programming interfaces (APIs) that allow querying for concepts on individual support tickets or for trends across multiple support tickets. As another example, the output can be in the form of a visualization such as a concept tree representing the individual support ticket that can be created from the identified concepts. As another example of an output visualization, a trait cloud can be generated that shows trends across multiple support tickets. Additional details relating to concept trees and trait clouds are discussed further below in the section entitled "INFERENCE VISUALIZATION."

As part of block 506, the output can be provided to a user, e.g., by displaying the output as a visualization or sending the output to another computing device for display or processing. For example, output can be sent from inference server 150 to a computing device such as client device 160, e.g., either in the server operations center 140 or at a remote location. Block 506 can also include updating output responsive to various user selections, e.g., different types of devices, date ranges, etc.

Next, at block 507, incremental learning can be performed. For example, a network engineer may determine that the individual support ticket that has been analyzed has a particular phrase that, while important to the central meaning of the individual support ticket, is not reflected by the concept tree for the individual support ticket. This can occur, for example, when the particular new phrase has not yet been mapped to the ontology. Thus, at block 507, the network engineer can manually choose to map the new phrase to a class of the ontology. As a specific example, the network engineer may choose to map the phrase "memory module" to the ontology model as an entity, e.g., a physical, replaceable entity. As new phrases are mapped to the ontology model, they can be added to knowledge base 152 for use in processing subsequent support tickets. For example, when the phrase "memory module" is added to the knowledge base, this phrase is now available for analyzing subsequent tickets that include the phrase "memory module."

Method 500 can thus be viewed as an iterative procedure that provides for constant refinement of the ontology model over time. One way to conceptualize method 500 is in various stages. First, a knowledge building phase (generally blocks 501-504) can be applied to an existing group of support tickets that serve to bootstrap inference engine 151 by building a knowledge base that maps a subset of phrases in the existing support tickets to classes of an ontology model. Next, an operational phase (generally blocks 505 and 506) can analyze additional support tickets (e.g., new or incoming support tickets) and generate outputs such as visualizations that reflect various concepts expressed in the new or incoming support tickets. Finally, an incremental learning phase (generally block 507) can map additional phrases discovered in the new or incoming support tickets to the classes of the ontology model and these new mappings can be added to the knowledge base. Thus, the inference engine can be refined over time by continually updating the knowledge base as new phrases are identified by users for inclusion in the knowledge base.

Phrase Extraction

Figure 6:
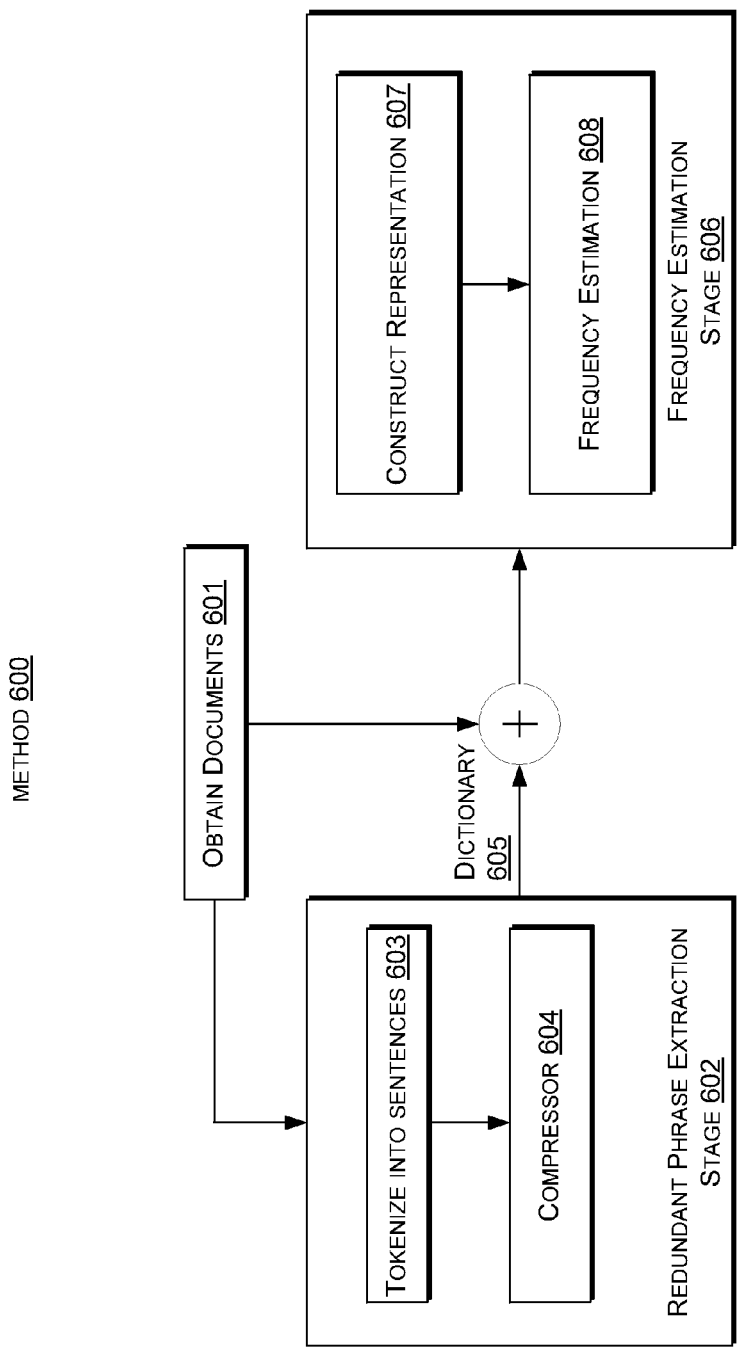

FIG. 6 illustrates an exemplary method 600 for performing phrase extraction that is suitable for implementation in system 100 or other systems. Generally speaking, method 600 can be viewed as a detailed explanation of block 502 of method 500. Phrase extraction component 203 of inference engine 151 can implement method 600, as discussed below. Note that method 600 is discussed herein as being implemented on the inference server for exemplary purposes, but is suitable for implementation on many different types of devices.

Method 600 can begin at block 601, where documents such as support tickets are obtained for processing by the method. For example, support ticket 141(1) and associated diary entry 400 may be obtained for further processing. As mentioned above, support tickets and associated diary entries can be obtained from server operations center 140.

Method 600 can continue at phrase extraction stage 602. Generally, phrase extraction stage 602 can perform redundant phrase extraction on documents via word-level compression. For example, stage 602 can identify what phrases appear in the support tickets and/or diary entries. Stage 602 can include blocks 603 and 604, discussed below.

Block 603 can tokenize text in the documents into sentences. For example, the support tickets and/or diary entries can be parsed into individual unigrams (e.g., words) and delimiters such as periods can be used to identify sentences.

Block 604 can use a compression algorithm to operate on the tokenized documents. For example, some implementations may use a Lempel-Ziv-Welch ("LZW") compression algorithm to build a dictionary 605 of phrases (e.g., sequences of unigrams) from the tokenized support tickets and/or diary entries, although other compression algorithms may be used as well. Generally, the compression algorithm can compress the text of the tokenized support tickets and/or diary entries and output compressed text while building a dictionary of each phrase that appears in the compressed text. Note that some implementations can discard the compressed output (e.g., a compressed binary) while retaining the dictionary. The dictionary can include some or all sequences of phrases of any length, e.g., applying the compression to just the phrase "back with findings" from diary entry 400 can result in dictionary entries including ["back", "with", "findings", "back with", "with findings", "back with findings"], and so on for the entire diary entry and/or support ticket. Note that some implementations may include only repeated phrases in the dictionary. Relatively infrequent phrases may use longer encoding since they will have less of an impact on the size of the compressed output.

Next, at frequency estimation stage 606, the documents and the dictionary are used to perform frequency estimation of redundant phrases. In some implementations, the frequency estimation is performed at stage 606 using a pattern matching technique such as the Aho-Corasick algorithm. Frequency estimation stage 606 can include blocks 607 and 608, discussed below.

Block 607 can include constructing an ordered representation of the dictionary 605. For example, a finite state automaton (e.g., a Trie) can be used to represent the dictionary, with an empty string at the root, unigrams at layer 1, bigrams at layer 2, and so on. Generally speaking, the Trie can be used to look up individual phrases in the dictionary.

Block 608 can include performing frequency estimation for individual phrases in the support tickets and/or diary entries. For example, the frequency estimation can be performed in a single pass over the support tickets and/or diary entries to match phrases (n-grams) in the support tickets and/or diary entries to entries in the Trie. The output of block 608 can be a frequency with which each entry in the dictionary appeared in the support tickets/diary entries, e.g., ["power"—672 entries, "power supply"—438 entries, "power supply unit"—362 entries], and so on.

Phrase Filtering

Figure 7:
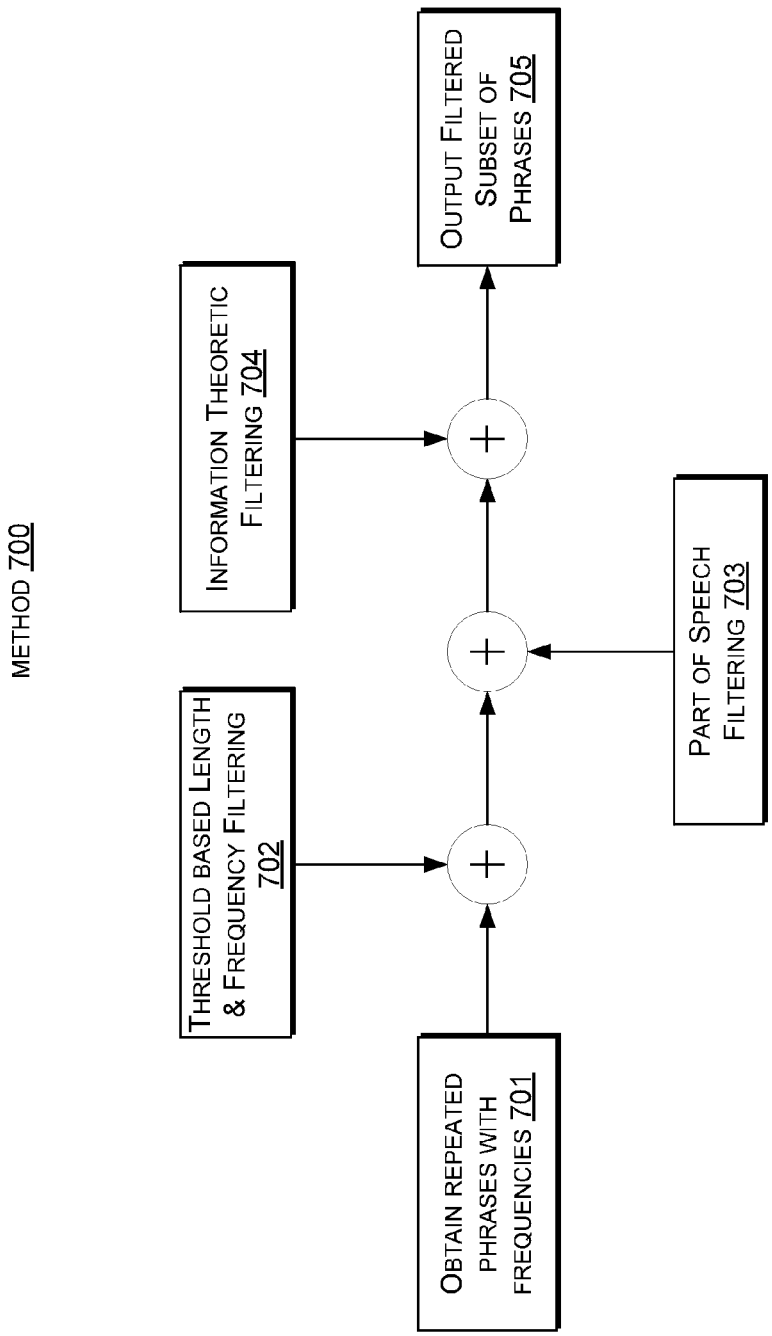

FIG. 7 illustrates a method 700 that is suitable for implementation in system 100 or other systems. Generally speaking, method 700 can be viewed as a detailed explanation of block 503 of method 500. Phrase filtering component 204 of inference engine 151 can implement method 700, as discussed below. Note that method 700 is discussed herein as being implemented on the inference server for exemplary purposes, but is suitable for implementation on many different types of devices.

Generally, some phrases that appear frequently in the existing support tickets can be useful for inferring meaning from the support tickets, e.g., the phrases "power supply unit" and "load balancer" can be central to understanding the meaning of a support ticket that indicates a power supply unit failed for a load balancer. In contrast, other phrases may also appear frequently in the support tickets, but these phrases may be less useful for understanding the meaning of the support tickets.

The following are several examples of frequently-occurring phrases that may generally be less useful for inferring meaning from support tickets. Network engineers may use predetermined formats or "templates" to communicate with each other, and thus phrases in these templates tend to appear relatively often in the support tickets/diary entries. As another example, devices may generate log messages during operation, and these log messages may be appended to support tickets that are in the process of being resolved. As a third example, email conversations may be appended to support tickets and it can be difficult to reconstruct the order of messages in an email conversation because email conversations tend to include many asynchronous replies. Also, note that some email conversations may include emails that do not include any specific information on resolving the problem, but rather discuss ancillary communication issues such as which individuals have been contacted, which vendors or teams or involved, etc. Also, "reply all" messages can tend to duplicate prior conversations that may not have specific information related to problem resolution. Thus, generally speaking, phrases that appear in templates, device logs, and email conversations will tend to appear frequently in the support tickets but often do not contribute to the central meaning of the support tickets. One goal of method 700 is to filter out such phrases automatically while retaining other phrases that do tend to contribute to the central meaning of the support tickets.

At block 701 of method 700, repeated phrases and their frequencies can be obtained, e.g., from phrase extraction component 203. As mentioned, the phrases can be n-grams of varying lengths, e.g., unigrams, bigrams, etc., up to arbitrary lengths. As discussed above, the frequencies can be obtained from the output of a pattern matching algorithm such as Aho-Corasick.

Next, blocks 702-704 generally can be viewed as individual filtering techniques to remove individual phrases from the set obtained from the phrase extraction component 203. Each block from blocks 702-704 can remove some of the phrases based on particular criteria.

For example, block 702 can perform length and/or frequency filtering to discard certain phrases. For example, as a general proposition, relatively long-length phrases tend to be "noisy" n-grams due to long repeated phrases (e.g., automated phrases) in the support tickets and/or diary entries. As noted previously, emails, logging messages, and frequently-repeated templates can include such long phrases that appear often in the support tickets and/or diary entries. Such phrases tend to be relative long in length, e.g., many automated emails may include phrases such as "if you need assistance outside of these hours please call the toll free number . . . " and so on. Such phrases tend to be of relatively little value in inferring concepts from a support ticket or diary entry. Thus, block 702 may filter out relatively long repeated phrases, e.g., over length 20, irrespective of how many times the phrases appear in the support tickets and/or diary entries.

Block 702 can also filter out relatively low-length phrases that appear with relatively low frequency, e.g., less than a certain percentage (e.g., 1%) or number of times (e.g., <10 occurrences in 1000+ tickets and/or associated diary entries). These phrases can tend to include multiple instances of mistyped words, for example, "pwer supply unit" may be misspelled multiple times in the support tickets/diary entries. Block 702 can also filter out phrases containing numbers as well as unigrams. After filtering out phrases over a predetermined length, shorter phrases of relatively low frequency, phrases containing numbers, and/or unigrams, the remaining phrases can tend to include a relatively higher concentration of useful terms for the subsequent processing described herein.

Next, block 703 can perform part-of-speech filtering to identify phrases remaining after block 702 that match predetermined part-of-speech patterns. For example, block 703 can implement Justeson-Katz collocation filtering to identify part of speech patterns such as [.* Adjective Noun .*], [.* Noun Noun .*], [.* Adjective Adjective Noun .*] [.* Adjective Noun Noun .*] [.* Noun Adjective Noun .*] [.* Noun Noun Noun .*] [.* Noun Preposition Noun .*], etc. Note the ".*" can represent using a regular expression to match zero or more instances of any character other than a newline either to the left or right of the part of speech patterns. Phrases that do not match any of the part-of-speech patterns can be discarded as part of block 703.

Block 704 can perform filtering based on one or more information theoretic measures. For example, residual inverse document frequency (RIDF) and mutual information (MI) measures can be computed for each phrase that is remaining after block 703. For convenience of terminology, the remaining phrases can fall into three groups, e.g., (1) n-grams that are filtered out by block 704, (2) n-grams that tend to be suited for building a domain-specific dictionary, and (3) n-grams that tend to be useful for inference processing discussed in more detail below.

With respect to group 2, n-grams with relatively low negative MI scores (e.g., below a threshold of −10) tend not to be found in standard dictionaries, e.g., they include technical words or terms used in unconventional ways. When n-grams with strongly negative MI have relatively high RIDF scores, e.g., above a threshold of 4, these terms can be used to build a domain-specific dictionary. In other words, phrases with strong negative MI and high RIDF tend to be domain-specific phrases that do not appear in conventional dictionaries and can be added at block 704 to a domain-specific dictionary such as knowledge base 152 for further processing.

With respect to group 3, block 704 can also identify phrases with high RIDF (e.g., above a threshold of 4) and positive MI (e.g., above a threshold 0) to identify particularly relevant phrases from the support tickets and/or diary entries. These phrases tend to include words that are part of a general vocabulary (e.g., words found in a standard English dictionary). Such phrases tend to be included in sentences and can be useful for concept inference, subject:object differentiation, and/or other subsequent processing discussed herein. The phrases can be sorted by RIDF and then by MI for subsequent review by an individual such as a domain expert, network engineer, etc.

Block 705 can output a filtered and sorted subset of phrases, e.g., the n-grams that are remaining after the three filtering blocks 702-704. Note that the number of phrases output at block 705 can be a function of the particular thresholds that are used for MI and/or RIDF at block 704. Thus, for relatively small datasets (i.e., relatively few tickets and/or diary entries) and/or high availability of domain experts, these thresholds can be set to allow a relatively higher percentage of phrases to pass through block 704. Conversely, for relatively large datasets and/or relatively low availability of domain experts, these thresholds can be set to allow a relatively lower percentage of phrases to pass through block 704.

Phrase Mapping

Generally speaking, the following explanation can be viewed as a detailed explanation of block 504 of method 500, where phrases are mapped to classes or subclasses of an ontology model and added to knowledge base 152. More specifically, some or all of the subset of phrases that are unfiltered by method 700 can be assigned to classes of the ontology model by an individual such as a network engineer, domain expert, etc. Note that the phrases left over after the filtering may be more likely to be relatively "important" in the sense that they are more likely to have some meaning that is pertinent to understanding the support tickets/diary entries from which they were extracted.

However, certain remaining unfiltered phrases may not be suited for use within the ontology model because they may lack specificity relative to other phrases. For example, consider the unigram "slot" and the bigram "memory slot." The phrase "slot" may not be as useful as the phrase "memory slot" for the purposes of understanding a ticket, because the phrase "memory slot" is more specific and provides more context for semantic interpretation.

For this reason, in some implementations, the individual can manually select from the subset of phrases left after filtering to identify phrases that are useful for mapping to the ontology model. For example, the individual may choose to assign the bigram "memory slot" to a particular class and/or subclass of the ontology model while dropping the unigram "slot." Likewise, the domain expert may choose to assign the bigram "enterprise cloud" to an ontology class and/or subclass while dropping the unigram "cloud." Note that this process is reasonable for manual efforts by an individual because the filtering by method 700 can result in a manageable number of phrases in the subset. In some implementations, it is this subset from which the individual chooses the phrases that go into the knowledge base 152.

Figure 8:
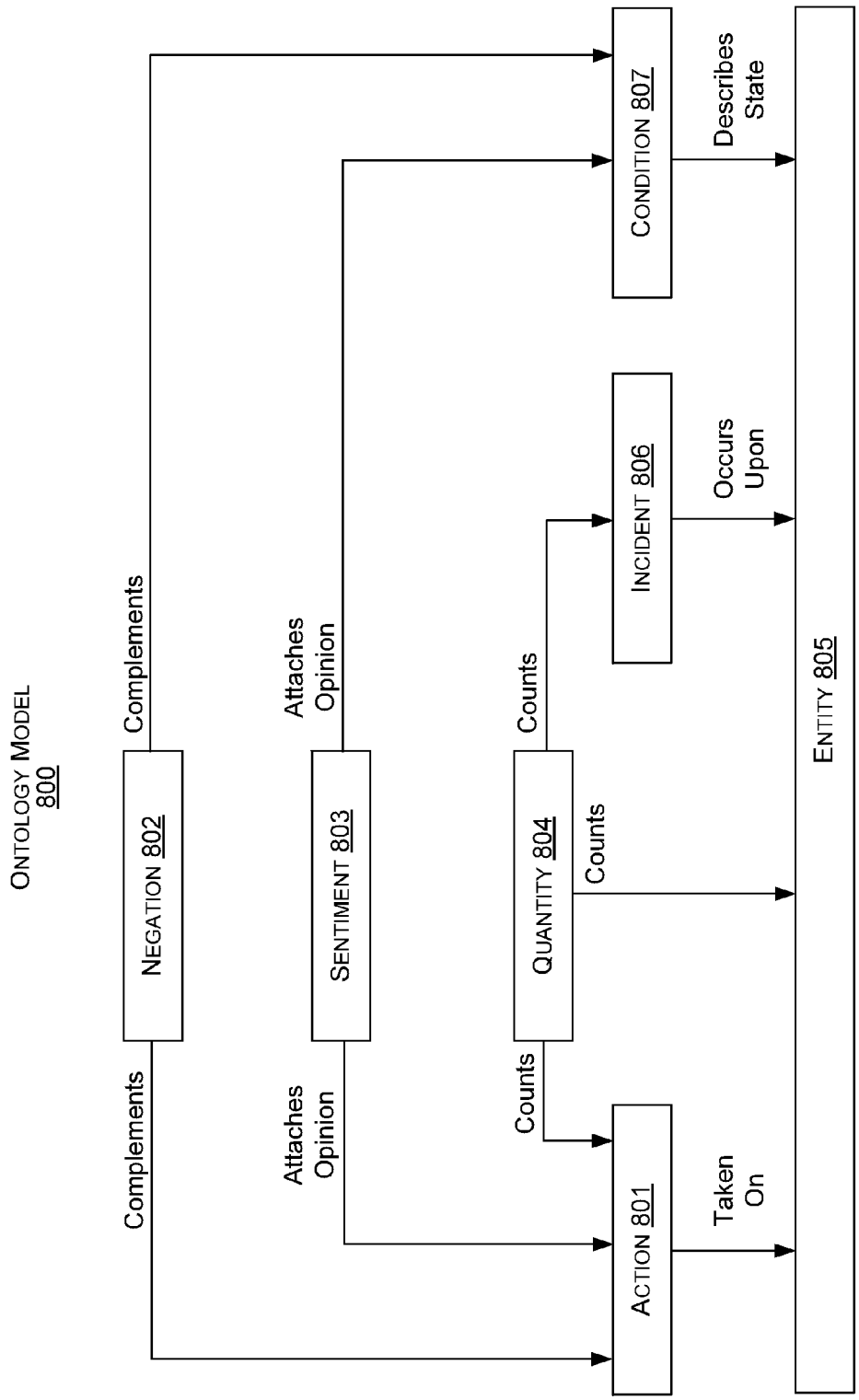
FIG. 8 shows an exemplary ontology model that can be employed in accordance with some implementations of the present concepts.

FIG. 8 illustrates an ontology model 800 that is consistent with the disclosed inventive concepts. Ontology model 800 can include various classes and/or subclasses, where each class/subclass can include one or more phrases and corresponds to some information provided by a document. In some implementations, the individual may select the particular class/subclass for each phrase. The specific ontology model 800 shown in FIG. 8 includes the classes: [Action, Negation, Sentiment, Quantity, Entity, Incident, Condition]. Each class is represented by a corresponding node in FIG. 8, e.g., [Action node 801, Negation node 802, Sentiment node 803, Quantity node 804, Entity node 805, Incident node 806, Condition node 807].

Note also that the arrows show relationships between individual classes consistent with the ontology model. These relationships represent valid interactions between the ontology classes. As discussed more below, an action "taken on" an entity is a valid interaction according to ontology model 800, as shown by the arrow connecting action node 801 to entity node 805. Conversely, an action "taken on" a condition would not be a valid interaction according to the ontology model since there is no corresponding arrow illustrating such a relationship between the action node 801 and the condition node 807.

Here, the "entity" class generally includes phrases that represent a "thing" that exists. The entity class can include subclasses such as ReplaceableEntity, VirtualEntity, and/or MaintenanceEntity. For example, a ReplaceableEntity is a tangible object that can be created, destroyed, or replaced, e.g., a device such as load balancer, power supply unit, router, etc. A VirtualEntity is an intangible object that can be created, destroyed, or replaced, e.g., a software configuration, a port channel, a kernel, etc. A MaintenanceEntity is a tangible object that can act upon other entities, e.g., a field technician, network engineer, etc.

The "action" class includes phrases that represent a behavior that is taken on an entity, e.g., a "power supply unit" is an entity that can be "replaced" by a replacement action. Subclasses of the action class can include MaintenanceActions that interact with an entity and/or alter the state of the entity, such as checking a device, cleaning a fiber cable, deploying, validating, verifying, etc. The actions class can also include a PhysicalActions subclass which includes creating, replacing, or destroying an entity, e.g., replacing a device (e.g., an RMA or "return merchandise authorization"), decommissioning a device, etc.

The "condition" class includes phrases that describe the state of an entity, e.g., a power supply unit or software configuration can have a faulty condition. A condition can further be classified as a ProblemCondition subclass or a MaintenanceCondition subclass. A ProblemCondition describes a condition known to have a negative effect such as inoperative, a reboot loop, etc. A MaintenanceCondition describes a condition that requires maintenance, e.g., a breakfix condition indicating a deployed entity needs maintenance.

The "incident" class includes phrases that occur upon an entity and can alter the state of an entity, e.g., a power spike incident could cause a power supply unit to transition from an acceptable condition to a faulty condition. The incident class can include a FalsePositiveIncident subclass, e.g., a state known not to cause problems such as a false positive or false alert. The incident class can also include an ErrorIncident subclass, e.g., a state known to cause a problem such as an error or exception.

The "quantity" class includes phrases that count or describe the quantity of an entity (e.g., two power supply units), an action (e.g., replaced power supply unit twice), or an incident (e.g., second power spike). Some implementations may use LowQuantity, MediumQuantity, and HighQuantity subclasses to distinguish phrases that reflect relatively low, moderate, and high quantities depending upon context. A quantity can also be used to reflect severity, e.g., LowQuantity can correspond to a relatively minor incident whereas HighQuantity can correspond to a relatively major incident.

The "negation" class includes phrases that negate another phrase, e.g., "did not replace power supply unit," "power supply unit is not faulty." The negation class can include a SyntheticNegations subclass that uses verbs or nouns to negate a condition, incident or action, e.g., phrases such as "absence of," "declined," "denied," etc. The negations class can also include AnalyticNegations subclass that uses "not" to negate a condition, incident or action.

The "sentiment" class includes phrases that add strength or weakness to an action or incident phrase, e.g., "I confirm that the power supply unit is faulty." The sentiments class can include a PositiveSentiment subclass, e.g., phrases such as "confirm" or "affirmative." The sentiment class can also include a NeutralSentiment subclass, e.g., phrases such as "not sure." The sentiment class can also include a NegativeSentiment subclass, e.g., phrases such as "likely" or "potential." Note that phases in the NegativeSentiment class can be phrases that may not explicitly indicate negative sentiment, but rather tend to be used by individuals when speculating about the nature of a network problem.

As mentioned above, an individual can assign some or all of the phrases remaining after method 700 to one or more classes or subclasses of ontology model 800. As the individual selects the class/subclass assignments, the mapping component 205 can receive input from the individual and update the knowledge base 152 with the assignments for use when processing other support tickets. Thus, the knowledge base includes a mapping of various phrases in the support tickets to classes and/or subclasses of the ontology model.

In further implementations, the domain expert may also provide a custom-built synonym dictionary to collapse various synonymous terms into a standardized term. For example, the terms "psu," "psus," "power supply," and "power supply unit" may each mean "power supply unit" and a dictionary entry can map each of these terms to "power supply unit." Likewise, the terms "gbic" (for Gigabit interface converter), "pic" (for port interface card), "fpc" (for flexible PIC concentrator) and "nic" (for network interface card) may each be various ways of expressing "network card" and the dictionary can therefore provide this mapping as well. As a further example, "flash," "sdram" (for synchronous dynamic random-access memory) "dram" (for dynamic random access memory) and "ddram" (for double data rate random access memory) can each be various ways of expressing "memory module" and another dictionary entry can express this relationship.

Note that the first example dictionary entry—"power supply unit"—reflects direct synonyms, whereas the second and third entries "network card" and "memory module" map individual types of network cards/memory modules to a more general term. In some implementations, the mapping component 205 can process the existing support tickets/diary entries to identify each instance of the synonyms/generalizations and replace them with a corresponding standardized term.

Also, note that in some implementations the individual may identify various phrases as antonyms or include certain phrases on a whitelist or blacklist. In some implementations, the whitelist can identify phrases that the individual defines for inclusion in knowledge base 152 irrespective of their occurrences in the support tickets or diary entries. Furthermore, in some implementations, the phrases on the whitelist are not mapped to synonyms or more general terms. Phrases on the blacklist may be excluded from the knowledge base irrespective of their occurrences in the support tickets or diary entries.

Document Analysis

Figure 9:
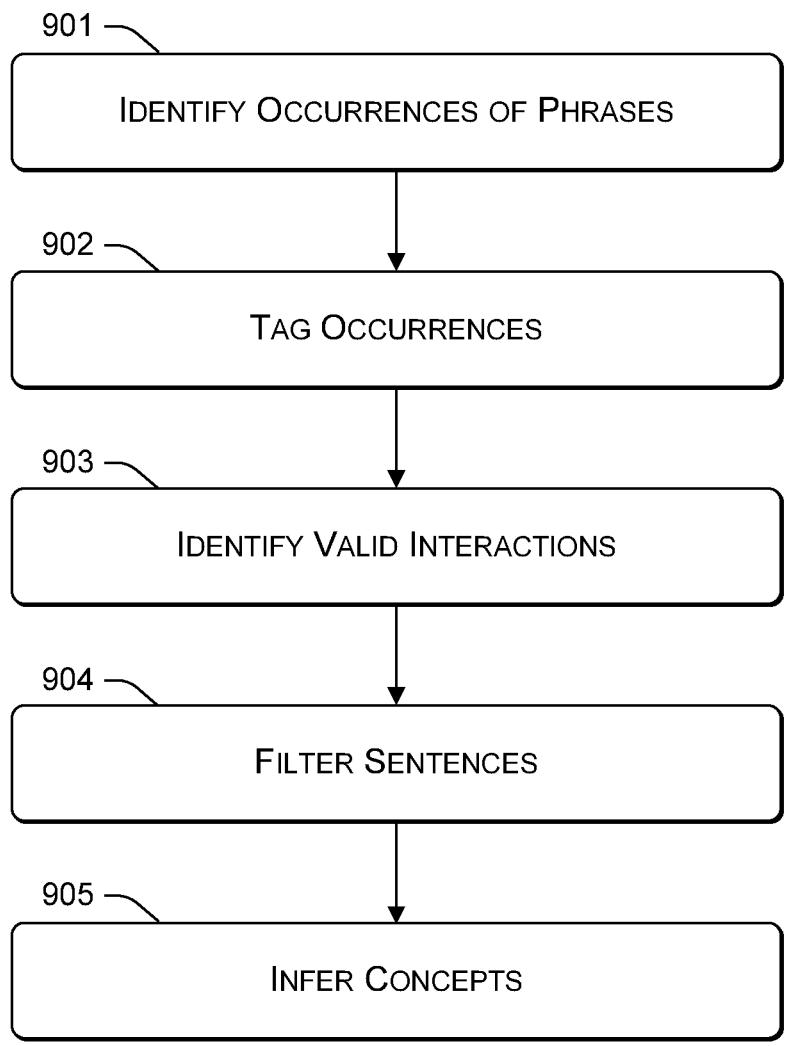

FIG. 9 illustrates a method 900 that is suitable for implementation in system 100 or other systems. Generally speaking, method 900 can be viewed as a detailed explanation of block 505 of method 500. Analysis component 206 of inference engine 151 can implement method 900, as discussed below. Note that method 900 is discussed herein as being implemented on the inference server for exemplary purposes, but is suitable for implementation on many different types of devices.

As mentioned above, once the selected phrases have been classified using ontology model 800, they are reflected in the knowledge base 152. Method 900 can, generally speaking, use the knowledge base to infer certain concepts expressed in the support tickets/diary entries. For example, during the operational phase (generally blocks 505 and 506 of method 500), an incoming support ticket and/or diary entry can be analyzed by the analysis component 206 using method 900 as follows.

Method 900 can begin at block 901, where occurrences of phrases are identified in a document. For example, each occurrence of the phrases in the knowledge base 152 in the individual support ticket/diary entries being analyzed can be identified by the analysis component. In other words, each phrase in the individual support ticket/diary entries being analyzed can be matched to corresponding phrases in the knowledge base.

Next, at block 902, the identified occurrences of the phrases can be tagged according to corresponding classes of ontology model 800. For example, text such as:
> We have raised a request #12345 and found that the device A23 Power LED is amber and it is in hung state. This device has silver power supply. We need to change the silver power supply to black. We will let you know once the power supply is changed.

can be processed to output text where the phrases occurring in the knowledge base are tagged with corresponding classes/subclasses from the ontology model. This can result in tagged text such as:

> We have raised a request #12345 and found that the (device)/ReplaceableEntity A23 (Power LED)/ReplaceableEntity is (amber)/Condition and it is in (hung state)/ProblemCondition. This device has (silver)/Condition (power supply)/ReplaceableEntity. We need to change the (silver)/Condition (power supply)/ReplaceableEntity to (black)/Condition. We will let you know once the (power supply)/ReplaceableEntity is (changed)/PhysicalAction.

Next, at block 903, the tagged text of the documents is processed to identify valid interactions according to the ontology model. Each sentence with at least one valid interaction can be identified. For example, some of the sentences in the individual support ticket and/or diary entry may have valid interactions and some may not have any valid interactions.

Next, at block 904, the sentences of the document that do not have any valid interactions can be filtered out. Thus, sentences in a support ticket/diary entry that do not include at least one valid interaction can be filtered out from further processing when analyzing the support ticket/diary entry, leaving a subset of sentences for further processing.

Next, at block 905, concepts can be inferred from the remaining subset of sentences. For example, the concepts can include Problems, Actions, and Activities. Problems can identify a particular network entity (e.g., router, link, power supply unit) and associated state, condition, or symptoms (e.g., crash, defective, reboot) as identified by a network engineer (e.g., bad memory, line card failure, crash of a load balancer) when the network engineer began troubleshooting. Activities can identify steps performed on the network entity during troubleshooting of a problem, e.g., pinging a network device, checking and cleaning cables, verifying device configuration, or other triage analysis steps performed before escalating the support ticket to higher levels of support. Actions can identify resolution actions performed on a network entity to mitigate a problem, e.g., rebooting a switch, replacing a line card, reseating a power supply, initiating an RMA for a load balancer, etc. Note that the Action concept is distinguishable from the action class of the ontology 800, e.g., the Action concept is an inferred meaning obtained from a given support ticket/diary entry whereas the action class is a way of grouping certain phrases in the knowledge base 152.

In some implementations, the analysis component 206 can be configured to match certain grammar patterns to the tagged sentences to identify the concepts. For example, the analysis component can use different grammar patterns for each of the types of concepts, e.g., Problems, Actions, or Activities. The grammar patterns can be built using the classes or subclasses of the ontology model as follows.

A suitable grammar pattern for identifying a Problem concept can be as follows:

> ReplaceableEntity | VirtualEntity | MaintenanceEntity preceded/succeeded by ProblemCondition For example, consider a sentence "The device was faulty" which can be tagged by the analysis component 206 as "The (device)/ReplaceableEntity was (faulty)/ProblemCondition." Here, the analysis component can fit the tagged sentence to the Problem grammar pattern above because a device (e.g., a ReplaceableEntity) is succeeded by the word faulty, which indicates a Problem Condition.

As another example, a suitable grammar pattern for identifying an Activity concept can be as follows:

> ReplaceableEntity|VirtualEntity|MaintenanceEntity preceded/succeeded by MaintenanceAction Now, consider the sentence "Check device connectivity and clean the fiber." This sentence can be tagged by the analysis component 206 as "(Check)/MaintenanceAction (device)/Replaceable Entity connectivity and (clean)/MaintenanceAction the (fiber)/ReplaceableEntity." Here, the analysis component 206 fits the tagged sentence to the Activity grammar pattern above because instances of MaintenanceAction precede/succeed instances of ReplaceableEntity in the sentence. In other words, two Activity concepts are identified in the sentence based on the sequences of ontological classes.

As another example, a suitable grammar pattern for identifying an Action concept can be as follows:

---
ReplaceableEntity|VirtualEntity|MaintenanceEntity
preceded/succeeded by PhysicalAction

---

Now, consider the sentence "An RMA was initiated for the load balancer." This sentence can be tagged by the analysis component 206 as "An (RMA)/PhysicalAction was initiated for the (load balancer)/ReplaceableEntity." Here, the analysis component 206 can fit the tagged sentence to the Activity grammar pattern above because an instance of a Physical Action (RMA) precedes an instance of a ReplaceableEntity (load balancer).

In some implementations, the analysis component 206 can confine the analysis to unstructured data such as freeform text in the support tickets and/or diary entries. Other implementations, however, may use structured data from the support tickets/diary entries and/or other data for analysis purposes. As one example, structured data from a support ticket (e.g., Problem Type from ticket data section 303) or from a diary entry (e.g., diary title 401) can be appended to the freeform text and analyzed as discussed above.

In other implementations, ticket titles, problem types, problem subtypes, etc., can be extracted and used directly as concepts (e.g, Problem concepts from problem type/subtype fields). Further implementations may validate concepts extracted in this manner relative to problems inferred from unstructured data. For example, some implementations may compare concepts directly extracted from structured data to concepts inferred from freeform text to see if the concepts match.

Data external to the support tickets/diary entries can also be leveraged during the analysis. For example, data describing maintenance events, configuration files for various devices, network event logs, system logs, traffic logs, etc., can also be processed during the analysis. For example, a given faulty device configuration inferred by the analysis component 206 can be correlated to a device configuration file.

Inference Visualization

During the operational phase of method 500, a user may want to understand the significance of a particular support ticket and/or associated diary entries. For example, the user may be a network engineer reviewing open support tickets to try to resolve them as quickly as possible. As mentioned above, block 506 of method 500 can include generating output that reflects the concepts expressed in an individual support ticket. For example, inference engine 151 can generate a visualization that reflects various concepts inferred from the support ticket. This can help the user quickly grasp the significance of the support ticket/diary entry, even when the support ticket/diary entry is very long and difficult to read quickly.

Figure 10:
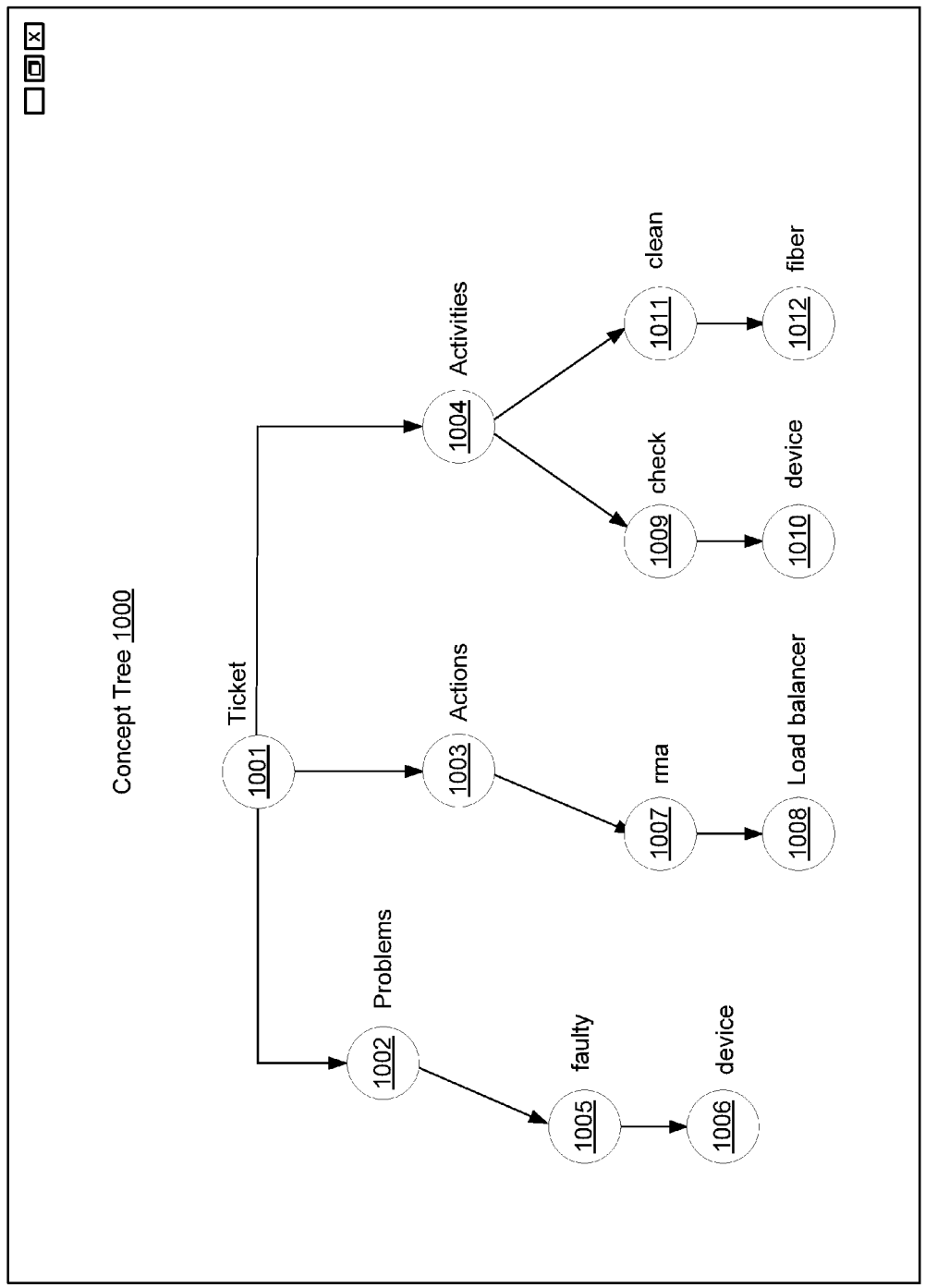
FIG. 10 shows an exemplary concept tree that can be employed in accordance with some implementations of the present concepts.

FIG. 10 illustrates an exemplary concept tree 1000 that is one example of a visualization that can be used represent an individual support ticket. Concept tree 1000 can be displayed directly on inference server 150 or transmitted by inference server 150 over network 110 to another device for display thereon, e.g., client device 160.

Concept tree 1000 includes a root node 1001 at depth 1 that represents the particular ticket. Root node 1001 is connected to a problems node 1002, an actions node 1003, and an activities node 1004. Tracing a path from problems node 1002 through node 1005 representing "faulty" and node 1006 representing "device" indicates that the support ticket was due to a particular problem, e.g., a faulty device. Note that this path through nodes 1002, 1005, and 1006 fits the Problems heuristic pattern identified above.

Similarly, tracing a path from actions node 1003 through node 1007 representing "RMA" and node 1008 representing "load balancer" indicates that a particular action was taken, e.g., the load balancer was RMA'd. Note that this path fits the Actions heuristic pattern identified above. Likewise, tracing a path from activities node 1004 through node 1009 representing "check" and node 1010 representing "device" indicates that the network engineer checked the device as one activity associated with the support ticket. Likewise, tracing a path from activities node 1004 through node 1011 representing "clean" and node 1012 representing "fiber" indicates that the network engineer cleaned the fiber as a second activity associated with the support ticket. Again, note that these paths 1004-1009-1010 and 1004-1011-1012 fit the Activity heuristic pattern mentioned above.

Also, note that the nodes within a given depth of concept tree 900 can have certain commonalities. At depth 1, the root node 1001 represents the individual support ticket as a whole. At depth 2, the nodes in the concept tree represent Problems, Activities, or Actions. At depth 3, the nodes in the concept tree represent actions or conditions describing an entity. At depth 4, the nodes represent individual entities that are connected to the parent action/condition at depth 3.

Concept tree 1000 can be presented as part of a graphical user interface that allows a user to interact with the concept tree. For example, users can move the mouse cursor over a given node and the immediate parent and sibling nodes can be highlighted. This can be useful, for example, for helping users quickly grasp the significance of relatively complicated concept trees.

During the operational phase of method 500, the user may also want to understand various trends across multiple support tickets. For example, a network engineer may want to know what major problems exist in devices made by a particular manufacturer, what problems dominate load balancer failures, what actions are taken when a device becomes operational, which manufacturer is causing the most maintenance costs, or other similar questions. As mentioned above, block 506 of method 500 can include generating output (e.g., a visualization) that reflects trends across multiple support tickets.

Figure 11:
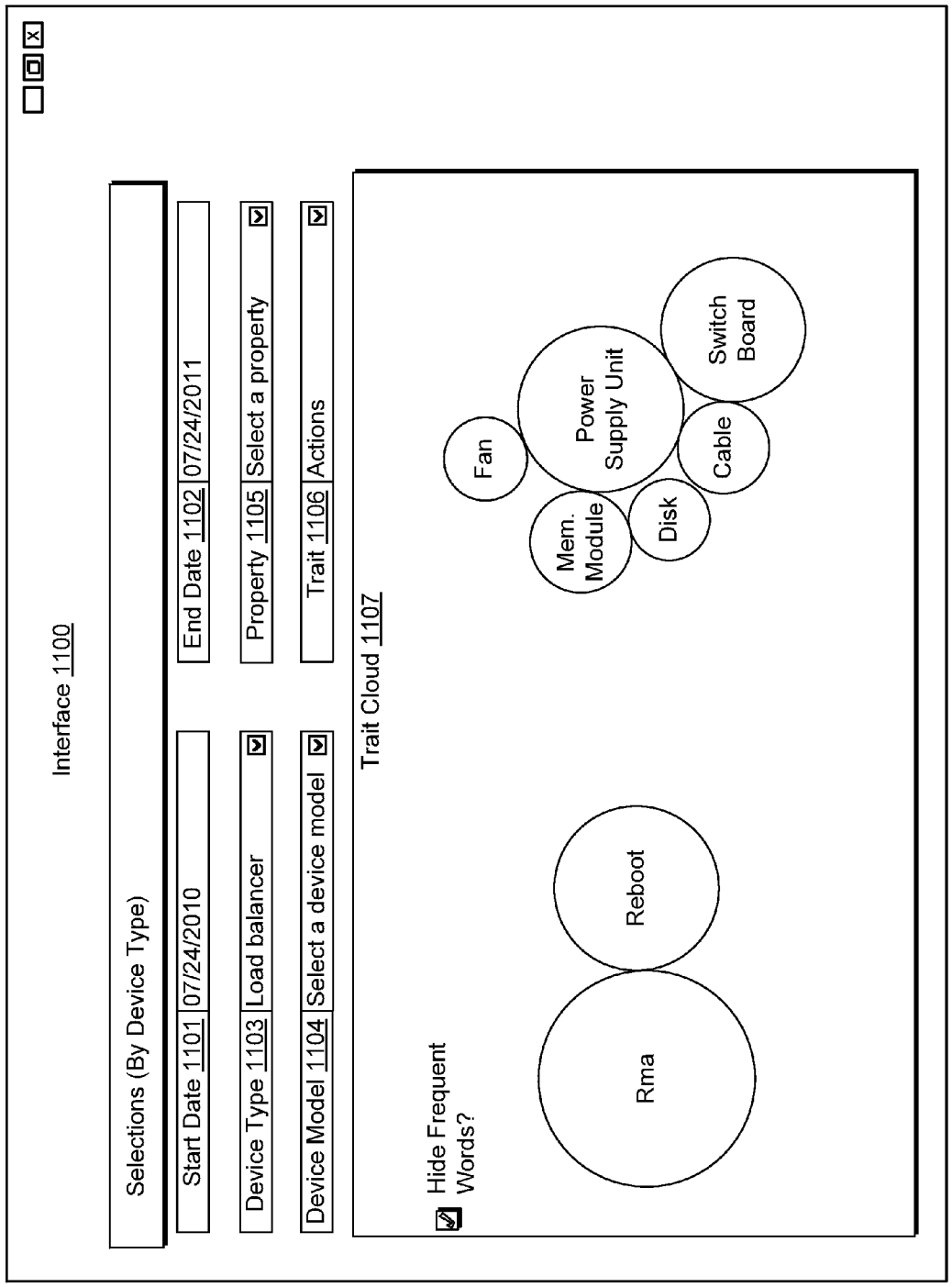
FIG. 11 shows an exemplary user interface that can be employed in accordance with some implementations of the present concepts.

FIG. 11 illustrates an exemplary interface 1100 that can be generated by output component 207 in some implementations. Interface 1100 can be a graphical user interface (GUI) with selectable user options to view analyses of support tickets at user-specified levels of granularity. For example, interface 1100 can include a start date field 1101 and an end date field 1102 that cause inference engine 151 to generate an analysis for support tickets dated within the specified time frame (e.g., tickets opened within the time range, closed within the time range, etc.).

Interface 1100 can also include a device type field 1103 to specify a particular device type (e.g., load balancer, router, etc.) as well as a device model field 1104 to specify a particular device model (e.g., models of load balancers, routers, etc., having different hardware specifications by model number). Property field 1105 can specify a particular device property (e.g., software/firmware version, failing component, etc). Trait field 1106 can specify a particular trait of the support tickets, e.g., concepts such as problems, actions, or activities identified by the analysis component 206. Note that fields 1101 and 1102 are shown as text fields and fields 1103-1106 are shown as drop-down menus, however, there are many alternative implementations (e.g., drop-down calendars for dates, radio buttons for traits, etc.).

Interface 1100 also includes a trait cloud portion 1107. Individual trait clouds in trait cloud portion 1107 are represented as circles sized relative to the number of instances individual concepts have been extracted from the group of support tickets. Generally speaking, individual clouds on the left side of trait cloud 1107 represent a concept, e.g., Problems, Actions, or Activities, whereas individual clouds on the right side of trait cloud 1107 represent entities involved with the concept in the text of the analyzed documents. As shown in FIG. 11, trait cloud portion 1107 identifies two actions, RMA and reboot, that appear in the group of support tickets represented by the trait cloud, with RMA being somewhat more prevalent. This indicates that, generally speaking, load balancers were associated with more RMA actions than reboot actions during the specified time period. The specific entities upon which these actions were taken are reflected on the right side of trait cloud portion 1107, e.g., power supply units, fans, memory modules, etc. Thus, a user viewing interface 1100 can see that load balancer problems have generally been fixed with RMA or reboot actions and that power supply units, fans, memory modules, etc, have been the subject of these actions. Such a user might conclude, therefore, that power supply units cause a substantial number of problems with load balancers and often need to be RMA'd to fix load balancer issues. The user might also conclude that memory module issues, while still prevalent, are less likely to be the cause of any particular failure associated with a load balancer.

CONCLUSION

Using the described implementations, automated processing of support tickets can be leveraged to infer concepts expressed by the support tickets. Furthermore, the automated processing can also be used to infer various trends across multiple support tickets. The concepts and trends can be output via various interfaces, e.g., visualizations, programming interfaces, etc. The outputs can be used to enhance the ability of network engineers to readily diagnose network problems for new or incoming support tickets by leveraging an ontology model that classifies phrases from previous support tickets. Newly-identified phrases in the new or incoming support tickets can be added to the ontology model over time to iteratively learn the new phrases for use as future support tickets arrive for processing.

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by a computing device, the method comprising:
   obtaining a plurality of documents, the plurality of documents having corresponding text;
   performing phrase extraction on the text to obtain a plurality of phrases that appear in the text;
   filtering out some phrases from the plurality of phrases based on one or more criteria to obtain a subset of the plurality of phrases;
   obtaining an ontology model that maps individual phrases from the subset of the plurality of phrases to classes or subclasses of the ontology model;
   obtaining a grammar pattern representing a concept, wherein the grammar pattern is defined by a first class or subclass of the ontology model preceding a second class or subclass of the ontology model;
   determining whether other documents match the grammar pattern, wherein the other documents match the grammar pattern when the other documents include first phrases of the first class or subclass preceding second phrases of the second class or subclass; and
   inferring that individual other documents that match the grammar pattern express the concept represented by the grammar pattern.

2. The method according to claim 1, wherein the plurality of documents comprise support tickets and associated diary entries reflecting troubleshooting of problems on an electronic network.

3. The method according to claim 2, wherein the concept represented by the grammar pattern indicates that a particular action was taken on a particular entity associated with the electronic network.

4. The method according to claim 1, wherein the performing phrase extraction comprises employing a compression algorithm to build a dictionary of phrases.

5. The method according to claim 4, wherein the performing phrase extraction comprises performing a frequency estimation of a number of times the plurality of phrases appear in the plurality of documents.

6. The method according to claim 1, wherein the filtering comprises part-of-speech filtering, length and frequency filtering, and information theoretic filtering using mutual information measures for the individual phrases.

7. The method according to claim 1, wherein the classes of the ontology model include an action class, a negation class, a sentiment class, a quantity class, an entity class, an incident class, and a condition class.

8. The method according to claim 1, further comprising:
   obtaining another grammar pattern representing another concept, wherein the another grammar pattern is defined by the first class or subclass of the ontology model preceded by a third class or subclass of the ontology model;
   determining whether the other documents match the another grammar pattern, wherein the other documents match the another grammar pattern when the other documents include first phrases of the first class or subclass preceding third phrases of the third class or subclass; and
   inferring that further other documents that match the another grammar pattern express the another concept represented by the another grammar pattern.

9. The method according to claim 1, further comprising generating output indicating that the individual other documents express the concept represented by the grammar pattern.

10. The method according to claim 9, wherein the concept is an action concept and the output is a visualization that identifies actions taken for devices of a particular device type.

11. One or more computer-readable storage devices or memory devices comprising device-readable instructions which, when executed by one or more processing devices, cause the one or more processing devices to perform acts comprising:
    identifying phrases in support tickets, wherein the support tickets include text describing troubleshooting steps taken by one or more network engineers to resolve one or more network problems;
    mapping the phrases in the support tickets to specific phrase classes, the specific phrase classes including an entity phrase class for phrases identifying network devices and an action phrase class for phrases identifying actions taken on the network devices;

identifying sequences of the entity phrase class and the action phrase class in the text of the support tickets;

inferring that the actions were taken on the network devices based on the identified sequences of the entity phrase class and the action phrase class in the text of the support tickets; and providing a user interface with representations of the actions that were taken on the network devices.

12. The one or more computer-readable storage devices or memory devices according to claim 11, wherein the user interface is a graphical user interface that includes a first representation of a first action taken with respect to certain network devices and a second representation of a second action taken with respect to the certain network devices.

13. The one or more computer-readable storage devices or memory devices according to claim 11, wherein the inferring comprises comparing sequences of various phrase classes in the text of the support tickets to an action grammar pattern that includes the entity phrase class and the action phrase class.

14. The one or more computer-readable storage devices or memory devices according to claim 11, wherein:

the specific phrase classes include a condition phrase class for phrases describing problem conditions of the network devices, the identifying the sequences comprises identifying other sequences of the condition phrase class and the entity phrase class in the text of the support tickets, and the inferring comprises inferring that the text of the support tickets indicates that the network devices experienced the problem conditions.

15. The one or more computer-readable storage devices or memory devices according to claim 11, the acts further comprising:

receiving, via the user interface, an input specifying a particular device model of the network devices and inferring that the actions were taken for the network devices of the particular device model.

16. A system comprising:

one or more computer-readable storage devices or memory devices comprising device-readable instructions configured to:

access failure logs comprising text;

map phrases in the text of the failure logs to phrase classes; and perform automated detection of concepts expressed in the failure logs by identifying sequences of the phrase classes in the text of the failure logs, the sequences of the phrase classes indicating actions or activities performed on network entities; and at least one processing device configured to execute the device-readable instructions.

17. The system according to claim 16, wherein the automated detection comprises comparing the sequences of the phrase classes to an action phrase class pattern representing the actions and an activity phrase class pattern representing the activities.

18. The system according to claim 16, wherein the detected concepts include a maintenance activity performed on an individual network device.

19. The system according to claim 16, wherein the detected concepts include a replacement activity performed on a defective network device.

20. The system according to claim 16, wherein at least some of the text in the failure logs was generated by a human.

* * * * *